United States Patent
Knight

(10) Patent No.: US 11,130,252 B2
(45) Date of Patent: Sep. 28, 2021

(54) ROLLING PLATE ASSEMBLY ATTACHMENT FOR PORTABLE POWER CUTTING TOOLS INCLUDING AN IMPROVED STRUCTURAL DESIGN, IMPROVED WHEEL CONFIGURATION, AND A CUTTING GUIDE

(71) Applicant: Eric Knight, Pacific Palisades, CA (US)

(72) Inventor: Eric Knight, Pacific Palisades, CA (US)

(73) Assignee: Circsaw Technologies LLC, Pacific Palisades, CA (US)

( * ) Notice: Subject to any disclaimer, the term of this patent is extended or adjusted under 35 U.S.C. 154(b) by 0 days.

(21) Appl. No.: 16/273,570

(22) Filed: Feb. 12, 2019

(65) Prior Publication Data

US 2019/0299482 A1 Oct. 3, 2019

Related U.S. Application Data

(63) Continuation-in-part of application No. 15/943,582, filed on Apr. 2, 2018, now Pat. No. 10,792,833.

(51) Int. Cl.
  *B27B 9/04* (2006.01)
  *B25F 5/00* (2006.01)
  *B27B 9/02* (2006.01)
(52) U.S. Cl.
  CPC ............... *B27B 9/04* (2013.01); *B25F 5/006* (2013.01); *B27B 9/02* (2013.01)

(58) Field of Classification Search
CPC .............. B26B 9/04; B25F 5/006; B27B 9/02
See application file for complete search history.

(56) References Cited

U.S. PATENT DOCUMENTS

| | | | | |
|---|---|---|---|---|
| 2,676,624 A * | 4/1954 | Gecmen | ............... | B23Q 9/0028 30/373 |
| 4,202,233 A * | 5/1980 | Larson | ................. | B23Q 9/0014 30/372 |
| 6,388,972 B1 * | 5/2002 | Saitou | ....................... | G11B 7/08 720/673 |
| 6,488,256 B1 * | 12/2002 | Chang | .................... | B23D 47/02 248/346.03 |
| 6,568,088 B1 | 5/2003 | Ende | | |
| 7,661,194 B1 | 2/2010 | Ende | | |
| 7,958,641 B1 | 6/2011 | Ende | | |
| 8,162,283 B1 * | 4/2012 | Royz | ....................... | F16M 11/10 248/455 |

(Continued)

*Primary Examiner* — Ghassem Alie
*Assistant Examiner* — Fernando A Ayala

(57) ABSTRACT

The present invention is an attachable rolling plate assembly which can be attached as a single unit to a portable cutting tool to facilitate the safe rolling movement of the portable cutting tool on the workpiece. The invention comprises a frame assembly formed from a single piece of molded material such as fiber enriched high-impact nylon having a pair of oppositely disposed longitudinal sidewalls with damping strips extending therefrom, and a flat base portion having an opening through which a saw blade of a power saw extends. The plate has front and rear fastening members to retain a plate of a power cutting saw onto the rolling plate assembly. The invention also includes a cutting guide assembly to facilitate a straight cut, reduce torsional rotation of the saw blade and reduce kickback of the saw.

16 Claims, 24 Drawing Sheets

(56) References Cited

U.S. PATENT DOCUMENTS

| | | |
|---|---|---|
| 8,181,559 B1 | 5/2012 | Ende |
| 8,209,872 B1 | 7/2012 | Ende |
| 9,114,546 B1* | 8/2015 | Francis .................... B27B 9/04 |
| 2009/0223337 A1* | 9/2009 | Wikle .................. B23D 47/126 |
| | | 83/397 |
| 2011/0185866 A1* | 8/2011 | Mirer ........................ B27B 9/04 |
| | | 83/13 |
| 2011/0203121 A1* | 8/2011 | Hartmann ............ B23D 59/002 |
| | | 30/377 |
| 2013/0118332 A1* | 5/2013 | Barnes ................ B23Q 9/0014 |
| | | 83/745 |
| 2013/0167383 A1* | 7/2013 | Weiland .................... B27B 9/02 |
| | | 30/377 |
| 2013/0269500 A1* | 10/2013 | Makkonen ................ B23C 1/20 |
| | | 83/879 |
| 2013/0283993 A1* | 10/2013 | Holladay .................. B27B 9/04 |
| | | 83/829 |
| 2015/0047484 A1* | 2/2015 | Lane .................... B23D 45/006 |
| | | 83/56 |
| 2016/0121513 A1* | 5/2016 | Mahoney ............... B27G 19/04 |
| | | 30/374 |

* cited by examiner

ROLLING PLATE ASSEMBLY ATTACHMENT FOR PORTABLE POWER CUTTING TOOLS INCLUDING AN IMPROVED STRUCTURAL DESIGN, IMPROVED WHEEL CONFIGURATION, AND A CUTTING GUIDE

CROSS-REFERENCE TO RELATED APPLICATION

This patent application is a continuation-in-part of patent application Ser. No. 15/943,582 filed on Apr. 2, 2018.

BACKGROUND OF THE INVENTION

1. Field of the Invention

The present invention relates to the field of portable power cutting tools and to an apparatus which facilitates the ease and safety of handling the portable power cutting tool during the operation of the tool.

2. Description of the Prior Art

Portable power circular saws, jig saws, and other power cutting tools are widely used. Most conventional circular saws come with a flat plate attached to the bottom of the circular saw. When the circular saw is in use to cut a workpiece, the bottom plate of the circular saw comes in contact with the workpiece and slides on the workpiece as the circular saw is moving forward along the cutting direction.

The problem with the conventional flat plate device is that during the cutting operation, extra effort is required from the user of the circular saw to overcome the friction between the bottom plate attached to the circular saw and the work-piece. In addition, the standard attachment plates are heavy and have a tendency to slide in a side-to-side motion which often reduces the accuracy of the cut.

In addition, rotatory power cutting tools such as a rotary power saw can create a dangerous situation called kick-back. The heavy weight of the saw causes the saw blade to move out of the linear motion due to an unstable frictional binding of the flat attachment plate against the workpiece. As a result of this veering of the blade off a straight line motion, the blade may bind with the workpiece and subsequently kick back against the worker, thereby possibly causing serious injury to the worker.

The problem has been addressed in U.S. Pat. No. 6,568,088 issued on May 27, 2003 for "Wheel Attachment For Portable Power Cutting Tools". While that was a fine invention, it was learned by the present inventor that the invention as embodied in the previous patent has several drawbacks and is no longer applicable to current power saws.

An improvement in the above patent is disclosed and claimed in U.S. Pat. No. 7,661,194 issued on Feb. 16, 2010 for "Rolling Plate Assembly Attachment For Portable Power Cutting Tools."

Another improvement in the area of the present invention is disclosed and claimed in U.S. Pat. No. 7,958,641 issued on Jun. 14, 2011 for "Rolling Plate Assembly Attachment For Portable Power Cutting Tools Including An Improved Structural Design And Manufactured Out Of Improved Materials, An Improved Wheel Configuration, And An Adjustable Bevel Gear And A Cutting Guide".

A further improvement in the area of the present invention is disclosed and claimed in U.S. Pat. No. 8,181,559 issued on May 22, 2012 for "Rolling Plate Assembly Attachment For Portable Power Cutting Tools Including An Improved Structural Design And Manufactured Out Of Improved Material, An Improved Wheel Configuration, And An Adjustable Bevel Gear And A Cutting Guide".

A further improvement in the area of the present invention is disclosed and claimed in U.S. Pat. No. 8,209,872 issued on Jul. 3, 2012 for "Rolling Plate Assembly Attachment For Portable Power Cutting Tools Including An Improved Structural Design And Manufactured Out Of Improved Material, An Improved Wheel Configuration, And An Adjustable Bevel Gear And A Cutting Guide".

All of the above inventions greatly improved the use of power saws. However, innovations in power tools and especially in power saws have created a necessity to further improve the previous inventions to accommodate changes in power saws.

SUMMARY OF THE PRESENT INVENTION

The following paragraphs discuss a first variation of the present invention which is a sidewinder saw where the saw blade is on the right hand side. The present invention is an attachable rolling plate assembly which is attached as a single unit to a portable cutting tool to facilitate the safe rolling movement of the portable cutting tool on a workpiece. The invention comprises a frame assembly formed from a single piece of injection molded fiber enriched plastic which facilitates strong weight and torsional stress memory and which includes a front wheel housing portion, a back wheel housing portion, and an improved structural plate design having an increased horizontal surface. The wheel housings each removably retain a wheel respectively located adjacent the leading transverse edge of the housing and adjacent the trailing transverse edge of the housing. The invention includes the pair of spaced apart wheels and means to retain a cutting tool on the housings so that the cutting tool can be rolled on the workpiece during operation of the tool while the cutting blade portion of the tool extends through an opening in the horizontal plate. The invention also includes a cutting guide assembly to facilitate a straight cut, reduce torsional rotation of the saw blade, reduce kickback of the saw, and allows for repeated rapid cuts of a same measurement by eliminating the need to repeatedly measure and mark new cut lines.

It has been discovered, according to the present invention, that if an attachment member used with a rotary power cutting tool is comprised of a structure which is made out of injection molded fiber enriched plastic which includes an increased flat plate surface area with adjustable power saw retaining members, then the attachment plate of the power saw is securely retained on the present invention rolling plate assembly so that the weight of the attachment member is significantly reduced while the structural integrity and strength is significantly increased, to facilitate ease of operation during the cutting process.

It has further been discovered, according to the present invention, that if the attachment member used with a rotary power cutting tool has a base plate which is made out of injection molded fiber enriched plastic which includes an increased flat plate surface area and is comprised of a single formed part having a front housing and rear housing. In addition, if each respective housing removably retains a single rolling wheel, each respective rolling wheel respectively having a portion which extends below the leading edge of the front housing and below the trailing edge of the rear housing, then a portable power tool can be retained on the attachment member. The attachment member thereby becomes a rolling plate assembly which facilitates a rolling motion of the power tool as it is used to operate on a workpiece. The improvement of having one long front wheel and one long rear wheel, each of which respectively extends for almost the entire width of a housing member significantly improves the traction and stability of the rolling plate assembly and improves the rolling operation of the assembly to reduce kickback of the power tool. For example, if the power tool is a rotary power cutting saw, then the rollable wheels facilitate a smooth rolling motion on the workpiece as the cutting operation is performed.

It has also been discovered, according to the present invention, that if the rolling wheels on the rolling plate assembly are made of material such as high-impact nylon or rubber which creates a traction on a workpiece as the part is rolling during a cutting operation, then the traction of the wheels prevents a side to side lateral movement of the power cutting tool such as rotary cutting saw. This improvement thereby reduces the possibility that the cutting blade will be caused to move out of alignment and thereby bind to the workpiece during cutting. The improvement therefore significantly reduces the possibility of a kick-back of the cutting rotary saw against the worker operating the power tool.

It has further been discovered, according to the present invention, that if wheels are removably retained within each housing member, then if one or more wheels becomes damaged or is badly worn, the damaged or worn wheel can be easily replaced and it is not necessary to discard the entire rolling plate assembly.

It has also been discovered, according to the present invention, that if the wheels of the rolling plate assembly have a diameter which raises the body of the rolling plate assembly above the workpiece, the ease of rolling is facilitated. In addition, the wheels help to absorb vibration from the power tool.

It has further been discovered, according to the present invention, that if the rolling plate assembly has means to quickly attach a power tool such as a rotary cutting saw to the assembly, then the assembly can be quickly attached thereby saving time and effort during the cutting process. One housing member can retain an attachment means which is attached to the front of a rotary power saw plate by an attaching bolt and is attached to the rear of a rotary power saw plate by three spaced apart locking assemblies including an upwardly slanted section which enables the rear end of the power saw to be accommodated to have varying lengths of the power saw plate and thicknesses of the power saw plate to be retained at the rear section of the rolling plate assembly.

It has additionally been discovered, according to the present invention, that if the frame assembly has means to retain a cutting guide which comprises an elongated frame by which the cutting guide is affixed to the frame assembly and which further comprises a housing rotatably supporting four spaced apart transverse wheels, then the wheels can be placed against the vertical surface of the workpiece and roll with the rolling plate assembly as the power tool is operated to facilitate the power tool moving in a straight line.

Therefore, the key innovative features of the present invention are: (1) a rolling plate assembly having removable wheels which can be quickly replaced and having each respective wheel adjacent the respective leading edge and the respective trailing edge of its retaining housing and partially extending below the housing; this arrangement enables the power tool to be lifted off the surface of the workpiece and to facilitate a smooth rolling motion of the power tool on the workpiece; (2) a guide mechanism which is affixed to the rolling plate assembly and has a rolling motion along the vertical surface of the workpiece in which the horizontal surface is being cut or otherwise operated on, to thereby facilitate a straight line motion of the power tool and reduce torsional rotation and kickback of the power tool; and (3) the base of the rolling plate assembly is made out of a single piece of injection molded fiber enriched plastic so that the torsional strength of the base plate is significantly improved. One example of the fiber enriched plastic is fiber enriched high-impact nylon.

It is therefore an object of the present invention to provide an attachment member which is used with a rotary power cutting tool and is comprised of a base plate made out of a single piece of injection molded fiber enriched plastic. As a result, the weight of the attachment member is significantly reduced and the torsional strength of the structural member is significantly increased, to thereby facilitate ease of operation during the cutting process.

It is a further object of the present invention to provide an attachment member to be used with a rotary power cutting tool which is comprised of a base plate which is made out of injection molded fiber enriched plastic which includes an increased flat plate surface area and is further comprised of a single formed part having a front and rear housing. In addition, each housing removably retains a single rolling wheel which respectively extends below the leading edge of the front housing and below the trailing edge of the rear housing, so that a portable power tool can be retained on the attachment member. The attachment member thereby becomes a rolling plate assembly which facilitates a rolling motion of the power tool as it is used to operate on a workpiece. The improvement of having one long front wheel which extends for almost the entire width of the housing and one long rear wheel which extends for the entire width of the housing significantly improves the traction and stability of the rolling plate assembly and improves the rolling operation of the assembly to reduce kickback of the power tool. For example, if the power tool is a rotary power cutting saw, then the rollable wheels facilitate a smooth rolling motion on the workpiece as the cutting operation is performed.

It is also an object of the present invention to include rollable wheels on the rolling plate assembly which are made of material such as high-impact nylon or rubber which creates a traction on a workpiece as the part is rolling during a cutting operation, so that the traction of the wheels prevent a side to side lateral movement of the power cutting tool such as a rotary cutting saw. The improvement thereby reduces the possibility that the cutting blade will be caused to move out of alignment and thereby bind to the workpiece during cutting. The improvement thereby significantly reduces the possibility of a kickback of the cutting rotary saw against the worker operating the power tool.

It is a further object of the present invention to have the wheels removably retained within each housing member, so that if one or more wheels becomes damaged or is badly worn, the damaged or worn wheel can be easily replaced and it is not necessary to discard the entire rolling plate assembly.

It is also an object of the present invention to provide wheels of the rolling plate assembly which have a diameter which raises the body of the rolling plate assembly above the workpiece, so that the ease of rolling is facilitated. In addition, the wheels help to absorb vibration from the power tool.

It is a further object of the present invention to provide a rolling plate assembly having means to quickly attach a power tool such as a rotary cutting saw to the assembly, so that the assembly can be quickly attached thereby saving time and effort during the cutting process. One housing member can retain an attachment means which is attached to the front of a rotary power saw plate by a transverse bolt and which is attached to a rotary power saw plate by three mating arms through which a respective attaching bolt is connected.

It is an additional object of the present invention to provide a frame assembly which has means to retain a cutting guide which comprises an elongated frame by which the cutting guide is affixed to the frame assembly. The cutting guide further comprises a housing rotatably supporting four spaced apart transverse wheels, so that the wheels can be placed against the vertical surface of the workpiece and roll with the rolling plate assembly as the power tool is operated to facilitate the power tool moving in a straight line provided the vertical surface is straight. As a result, the cutting guide facilitates a straight line motion of the power tool such as a circular power saw, reduces torsional rotation of the power tool, and reduces kickback of the power tool.

Defined in great detail, the present invention is a rolling plate assembly adapted for attachment to a rotary power saw having a rotary power saw flat plate and a rotating saw blade, the rolling plate assembly comprising:

a. a base formed out of a single piece of fiber enriched nylon, the base including a top front side having a first housing retaining member and a second housing retaining member, and a front back side having a front wheel housing member removably retaining a front heel;

b. said base also including a rear side with a rear back side having a rear wheel housing removably retaining a rear wheel, the rear wheel parallel to the front wheel;

c. said rear section connected to said first housing retaining member on a first side by a first longitudinal sidewall and said rear section connected to said second housing retaining member on an opposite side by a parallel oppositely disposed second longitudinal sidewall;

d. said rear section includes three rear retaining housing members including:
 (i) a first rear retaining housing member including a first longitudinal slot through which a first rear flat retaining rod having a flat rectangular shaped section slidably extends, the first rectangular section extending to a first downwardly sloped section extending to a first upwardly sloped section having a first lower sloped surface, a first threaded bolt which extends through a first threaded opening in first rear retaining housing member,
 (ii) a second rear retaining housing member including a second longitudinal slot through which a second rear flat retaining rod having a flat rectangular shaped section slidably extends, the second rectangular section extending to a second downwardly sloped section extending to a second upwardly sloped section having a second sloped lower surface a second threaded bolt which extends through a second threaded opening in second rear retaining housing member,
 (iii) a third rear retaining housing member including a third longitudinal slot through which a third rear flat retaining rod having a flat rectangular shaped section slidably extends, the third rectangular section extending to a third downwardly sloped section extending to a third upwardly sloped section having a third sloped lower surface a third threaded bolt which extends through a third threaded bolt which extends through a third threaded opening in third rear retaining housing member,
 (iv) the first rear retaining member parallel to and adjacent to the first longitudinal sidewall, the third rear retaining member parallel to and adjacent to the second longitudinal sidewall, and the second rear retaining member parallel to and between the first and third retaining members;

e. said first longitudinal sidewall has a first raised stabilizer rail including a first top surface portion and a spaced apart second top surface portion with a third recessed portion in-between and having an arcuate tip respectively extending from the recessed portion to the first and second top surface portions of the first raised stabilizer rail, and said opposite second longitudinal sidewall has a second raised stabilizer rail having a top surface aligned with the first and second top surface portions of the first stabilizer rail;

f. said base further comprising a horizontal flat plate section having a top surface and a back surface and extending between said front wheel housing member and said rear wheel housing member with said flat plate section having a saw blade penetration opening which is bounded by an interior sidewall extending from the top surface to the bottom surface;

g. located between and parallel to said first longitudinal sidewall and said opening on said flat plate section are a first flat damping strip on the top surface and a spaced apart second flat damping strip on the top surface;

h. said first housing retaining member having a first slot and a first threaded opening receiving a first threaded bolt aligned with the first slot and said second housing retaining member having a second slot and an offset gap with a second threaded opening receiving a second threaded bolt aligned with the gap;

i. a cutting guide having a longitudinal flat frame with a front end and a rear end, a transverse wheel housing located between the front end and rear end of the longitudinal frame, a handle beginning at the rear end and extending to the wheel housing, the longitudinal flat frame of the cutting guide extending through the first slot and the second slot, and retained in position by the first threaded bolt; and j. the saw flat plate retained at its front end through insertion into said gap and retained by the second threaded bolt and the saw flat plate retained at its rear end by a respective lower surface of a respective upwardly sloped rear retaining member, the saw blade partially extending through the saw blade opening.

In addition to the features set forth above, the present invention also has the following features:

The rolling plate assembly adapted for attachment to a rotary power saw having a rotary power saw flat plate and a rotating saw blade, as described in detail above, further comprising: said base contains at least one rubber damping strip located between said first longitudinal sidewall and said second longitudinal sidewall.

The rolling plate assembly adapted for attachment to a rotary power saw having a rotary power saw flat plate and a rotating saw blade as described in detail above, further comprising: located between and parallel to said first longitudinal sidewall and said opening on said flat plate section are a first rubber damping strip and a spaced apart second rubber damping strip aligned with said flat plate surface.

The rolling plate assembly adapted for attachment to a rotary power saw having a rotary power saw flat plate and a rotating saw blade, as described in detail above, further comprising: said base is made from a material selected from the group consisting of injection molded fiber enriched plastic, high-impact nylon, and metal.

The rolling plate assembly adapted for attachment to a rotary power saw having a rotary power saw flat plate and a rotating saw blade as described in detail above, further comprising: said first housing retaining member having a first slot and a first threaded opening receiving a first threaded bolt aligned with the first slot and said second housing said first housing retaining member having a first slot and a first threaded opening receiving a first threaded bolt aligned with the first slot and said second housing The rolling plate assembly adapted for attachment to a rotary power saw having a rotary power saw flat plate and a rotating saw blade as described in detail above, further comprising: said first housing retaining member having a first slot and a first threaded opening receiving a first threaded bolt aligned with the first slot and said second housing said first housing retaining member having a first slot and a first threaded opening receiving a first threaded bolt aligned with the first slot.

The rolling plate assembly adapted for attachment to a rotary power saw having a rotary power saw flat plate and a rotating saw blade as described in detail above, further comprising: a cutting guide having a longitudinal flat frame with a front end and a rear end, a transverse wheel housing located between the front end and rear end of the longitudinal frame, a handle beginning at the rear end and extending to the wheel housing, the longitudinal flat frame of the cutting guide extending through the first slot and the second slot, and retained in position by the first threaded bolt.

The rolling plate assembly adapted for attachment to a rotary power saw having a rotary power saw flat plate and a rotating saw blade as described in detail above, further comprising: the wheel housing further comprising: at least two wheels facing toward the front end of the cutting guide.

The rolling plate assembly adapted for attachment to a rotary power saw having a rotary power saw flat plate and a rotating saw blade as described in detail above, further comprising: the wheel housing further comprising: at least two wheels facing toward the rear end of the cutting guide.

The rolling assembly adapted for attachment to a rotary power saw having a rotary power saw flat plate and a rotating saw blade as described in detail above, further comprising: the front wheel and the rear wheel of the rolling plate assembly are made of high-impact nylon or rubber.

Further novel features and other objects of the present invention will become apparent from the following detailed description, discussion and the appended claims, taken in conjunction with the drawings.

A second embodiment for the present invention rolling plate assembly adapted for attachment to a rotary power saw is for a worm drive or left bladed saw. Typically worm drives or left bladed saws have the motor at the rear and the saw blade on the left.

It is an object of the present invention to have one retaining member at the back of the rolling plate assembly for the worm drive instead of the three that are disclosed on the sidewinder saw. One of the differences between the two embodiments (sidewinder and worm drive) are the number of rear retaining members and locations of those retaining members needed to retain a saw. The improved rolling plate assembly for the worm drive has three contact points for the left saw, one in the front, one in the rear, and one on the opposite side between the front and rear contact points.

The following paragraphs discuss the second variation of the present invention which is the worm drive saw where the saw blade is on the left hand side. Certain elements are the same in both variations so the advantages previously discussed for the sidewinder saw also apply to the worm drive saw. Therefore, those advantages are repeated again.

The following paragraphs discuss a second variation of the present invention which is a worm drive where the saw blade is on the left hand side. The present invention is an attachable rolling plate assembly which is attached as a single unit to a portable cutting tool to facilitate the safe rolling movement of the portable cutting tool on a workpiece. The invention comprises a frame assembly formed from a single piece of injection molded fiber enriched plastic which facilitates strong weight and torsional stress memory and which includes a front wheel housing portion, a back wheel housing portion, and an improved structural plate design having an increased horizontal surface. The wheel housings each removably retain a wheel respectively located adjacent the leading transverse edge of the housing and adjacent the trailing transverse edge of the housing. The invention includes the pair of spaced apart wheels and means to retain a cutting tool on the housings so that the cutting tool can be rolled on the workpiece during operation of the tool while the cutting blade portion of the tool extends through an opening in the horizontal plate. The invention also includes a cutting guide assembly to facilitate a straight cut, reduce torsional rotation of the saw blade, reduce kickback of the saw, and allows for repeated rapid cuts of a same measurement by eliminating the need to repeatedly measure and mark new cut lines.

It has been discovered, according to the present invention, that if an attachment member used with a rotary power cutting tool is comprised of a structure which is made out of injection molded fiber enriched plastic which includes an increased flat plate surface area with adjustable power saw retaining members, then the attachment plate of the power saw is securely retained on the present invention rolling plate assembly so that the weight of the attachment member is significantly reduced while the structural integrity and strength is significantly increased, to facilitate ease of operation during the cutting process.

It has further been discovered, according to the present invention, that if the attachment member used with a rotary power cutting tool has a base plate which is made out of injection molded fiber enriched plastic which includes an increased flat plate surface area and is comprised of a single formed part having a front housing and rear housing. In addition, if each respective housing removably retains a single rolling wheel, each respective rolling wheel respectively having a portion which extends below the leading edge of the front housing and below the trailing edge of the rear housing, then a portable power tool can be retained on the attachment member. The attachment member thereby becomes a rolling plate assembly which facilitates a rolling motion of the power tool as it is used to operate on a workpiece. The improvement of having one long front wheel and one long rear wheel, each of which respectively extends for almost the entire width of a housing member significantly improves the traction and stability of the rolling plate assembly and improves the rolling operation of the assembly to reduce kickback of the power tool. For example, if the power tool is a rotary power cutting saw, then the rollable wheels facilitate a smooth rolling motion on the workpiece as the cutting operation is performed.

It has also been discovered, according to the present invention, that if the rolling wheels on the rolling plate assembly are made of material such as high-impact nylon or rubber which creates a traction on a workpiece as the part is rolling during a cutting operation, then the traction of the wheels prevents a side to side lateral movement of the power cutting tool such as rotary cutting saw. This improvement thereby reduces the possibility that the cutting blade will be caused to move out of alignment and thereby bind to the workpiece during cutting. The improvement therefore significantly reduces the possibility of a kickback of the cutting rotary saw against the worker operating the power tool.

It has further been discovered, according to the present invention, that if wheels are removably retained within each housing member, then if one or more wheels becomes damaged or is badly worn, the damaged or worn wheel can be easily replaced and it is not necessary to discard the entire rolling plate assembly.

It has also been discovered, according to the present invention, that if the wheels of the rolling plate assembly have a diameter which raises the body of the rolling plate assembly above the workpiece, the ease of rolling is facilitated. In addition, the wheels help to absorb vibration from the power tool.

It has further been discovered, according to the present invention, that if the rolling plate assembly has means to quickly attach a power tool such as a rotary cutting saw to the assembly, then the assembly can be quickly attached thereby saving time and effort during the cutting process. One housing member can retain an attachment means which is attached to the front of a rotary power saw plate by an attaching bolt and is attached to the rear of a rotary power saw plate by three spaced apart locking assemblies including an upwardly slanted section which enables the rear end of the power saw to be accommodated to have varying lengths of the power saw plate and thicknesses of the power saw plate to be retained at the rear section of the rolling plate assembly.

It has additionally been discovered, according to the present invention, that if the frame assembly has means to retain a cutting guide which comprises an elongated frame by which the cutting guide is affixed to the frame assembly and which further comprises a housing rotatably supporting four spaced apart transverse wheels, then the wheels can be placed against the vertical surface of the workpiece and roll with the rolling plate assembly as the power tool is operated to facilitate the power tool moving in a straight line provided the vertical surface is straight.

Therefore, the key innovative features of the present invention are: (1) a rolling plate assembly having removable wheels which can be quickly replaced and having each respective wheel adjacent the respective leading edge and the respective trailing edge of its retaining housing and partially extending below the housing; this arrangement enables the power tool to be lifted off the surface of the workpiece and to facilitate a smooth rolling motion of the power tool on the workpiece; (2) a guide mechanism which is affixed to the rolling plate assembly and has a rolling motion along the vertical surface of the workpiece in which the horizontal surface is being cut or otherwise operated on, to thereby facilitate a straight line motion of the power tool and reduce torsional rotation and kickback of the power tool; and (3) the base of the rolling plate assembly is made out of a single piece of injection molded fiber enriched plastic so that the torsional strength of the base plate is significantly improved. One example of the fiber enriched plastic is fiber enriched high-impact nylon.

It is therefore an object of the present invention to provide an attachment member which is used with a rotary power cutting tool and is comprised of a base plate made out of a single piece of injection molded fiber enriched plastic. As a result, the weight of the attachment member is significantly reduced and the torsional strength of the structural member is significantly increased, to thereby facilitate ease of operation during the cutting process.

It is a further object of the present invention to provide an attachment member to be used with a rotary power cutting tool which is comprised of a base plate which is made out of injection molded fiber enriched plastic which also includes an increased flat plate surface area and is further comprised of a single formed part having a front and rear housing. In addition, each housing removably retains a single rolling wheel which respectively extends below the leading edge of the front housing and below the trailing edge of the rear housing, so that a portable power tool can be retained on the attachment member. The attachment member thereby becomes a rolling plate assembly which facilitates a rolling motion of the power tool as it is used to operate on a workpiece. The improvement of having one long front wheel which extends for almost the entire width of the housing and one long rear wheel which extends for the entire width of the housing significantly improves the traction and stability of the rolling plate assembly and improves the rolling operation of the assembly to reduce kickback of the power tool. For example, if the power tool is a rotary power cutting saw, then the rollable wheels facilitate a smooth rolling motion on the workpiece as the cutting operation is performed.

It is also an object of the present invention to include rollable wheels on the rolling plate assembly which are made of material such as high-impact nylon or rubber which creates a traction on a workpiece as the part is rolling during a cutting operation, so that the traction of the wheels prevent a side to side lateral movement of the power cutting tool such as a rotary cutting saw. The improvement thereby reduces the possibility that the cutting blade will be caused to move out of alignment and thereby bind to the workpiece during cutting. The improvement thereby significantly reducing the possibility of a kickback of the cutting rotary saw against the worker operating the power tool.

It is a further object of the present invention to have the wheels removably retained within each housing member, so that if one or more wheels becomes damaged or is badly worn, the damaged or worn wheel can be easily replaced and it is not necessary to discard the entire rolling plate assembly.

It is also an object of the present invention to provide wheels of the rolling plate assembly which have a diameter which raises the body of the rolling plate assembly above the workpiece, so that the ease of rolling is facilitated. In addition, the wheels help to absorb vibration from the power tool.

It is a further object of the present invention to provide a rolling plate assembly having means to quickly attach a power tool such as a rotary cutting saw to the assembly, so that the assembly can be quickly attached thereby saving time and effort during the cutting process. One housing member can retain an attachment means which is attached to the front of a rotary power saw plate by a transverse bolt and which is attached to a rotary power saw plate by three mating arms through which a respective attaching bolt is connected.

It is an additional object of the present invention to provide a frame assembly which has means to retain a cutting guide which comprises an elongated frame by which the cutting guide is affixed to the frame assembly. The cutting guide further comprises a housing rotatably supporting four spaced apart transverse wheels, so that the wheels can be placed against the vertical surface of the workpiece and roll with the rolling plate assembly as the power tool is operated to facilitate the power tool moving in a straight line provided the vertical surface is straight. As a result, the cutting guide facilitates a straight line motion of the power tool such as a circular power saw, reduces torsional rotation of the power tool, and reduces kickback of the power tool.

The present invention is an attachable rolling plate assembly which is attached as a single unit to a portable cutting tool to facilitate the safe rolling movement of the portable cutting tool on a workpiece. The invention comprises a frame assembly formed from a single piece of injection molded fiber enriched plastic which facilitates strong weight and torsional stress memory and which includes a front wheel housing portion, a back wheel housing portion, and an improved structural plate design having an increased horizontal surface. The wheel housings each removably retain a wheel respectively located adjacent the leading transverse edge of the housing and adjacent the trailing transverse edge of the housing. The invention includes a pair of spaced apart wheels and means to retain a cutting tool on the housing so that the cutting tool can be rolled on the workpiece during operation of the tool while the cutting blade portion of the tool extends through an opening in the horizontal plate. The invention also includes a cutting guide assembly to facilitate a straight cut, reduce torsional rotation of the saw blade, reduce kickback of the saw, and allows for repeated rapid cuts of a same measurement by eliminating the need to repeatedly measure and mark new cut lines.

It has been discovered, according to the present invention, that if an attachment member used with a rotary power cutting tool is comprised of a structure which is made out of injection molded fiber enriched plastic which includes an increased flat plate surface area with adjustable power saw retaining members, then the attachment plate of the power saw is securely retained on the present invention rolling plate assembly so that the weight of the attachment member is significantly reduced while the structural integrity and strength is significantly increased, to facilitate ease of operation during the cutting process.

It has also been discovered, according to the present invention, that if the rolling wheels on the rolling plate assembly are made of material such as high-impact nylon or rubber which creates a traction on a workpiece as the part is rolling during a cutting operation, then the traction of the wheels prevents a side to side lateral movement of the power cutting tool such as rotary cutting saw. This improvement thereby reduces the possibility that the cutting blade will be caused to move out of alignment and thereby bind to the workpiece during cutting. The improvement therefore significantly reduces the possibility of a kickback of the cutting rotary saw against the worker operating the power tool.

It has further been discovered, according to the present invention, that if wheels are removably retained within each housing member, then if one or more wheels becomes damaged or is badly worn, the damaged or worn wheel can be easily replaced and it is not necessary to discard the entire rolling plate assembly.

It has also been discovered, according to the present invention, that if the wheels of the rolling plate assembly have a diameter which raises the body of the rolling plate assembly above the workpiece, the ease of rolling is facilitated. In addition, the wheels help to absorb vibration from the power tool.

It has further been discovered, according to the present invention, that if the rolling plate assembly has means to quickly attach a power tool such as a rotary cutting saw to the assembly, then the assembly can be quickly attached thereby saving time and effort during the cutting process. One housing member can retain an attachment means which is attached to the front of a rotary power saw plate by an attaching bolt and is attached to the rear of a rotary power saw plate by three spaced apart locking assemblies including an upwardly slanted section which enables the rear end of the power saw to be accommodated to have varying lengths of the power saw plate and thicknesses of the power saw plate to be retained at the rear section of the rolling plate assembly.

It has additionally been discovered, according to the present invention, that if the frame assembly has means to retain a cutting guide which comprises an elongated frame by which the cutting guide is affixed to the frame assembly and which further comprises a housing rotatably supporting four spaced apart transverse wheels, then the wheels can be placed against the vertical surface of the workpiece and roll with the rolling plate assembly as the power tool is operated to facilitate the power tool moving in a straight line provided the vertical surface is straight.

Defined in great detail, the worm drive embodiment of the present invention is a rolling plate assembly adapted for attachment to a rotary power saw having a rotary power saw flat plate and a rotating saw blade, the rolling plate assembly comprising:

a. a base formed out of a single piece of fiber enriched high-impact nylon, the base including a top front side having a front saw retaining member and a front guide retaining member and a front back side having a front wheel housing member removably retaining a front wheel;

b. said base also including a rear side with a rear section having a rear wheel housing removably retaining a rear wheel, the rear wheel parallel to the front wheel;

c. said rear section connected to said front guide retaining member on a first side by a first longitudinal sidewall and said rear section connected to said front saw retaining member on an opposite side by a parallel oppositely disposed second longitudinal sidewall;

d. said rear section includes a rear retaining housing member with said rear retaining housing member including a longitudinal slot through which a rear flat retaining rod having a flat rectangular shaped section slidably extends, the flat rectangular shaped section extending to a downwardly sloped section and the extending to an upwardly sloped section having a sloped lower surface, a threaded bolt which extends through a first threaded opening in the rear retaining housing member;

e. said first longitudinal sidewall has a first raised stabilizer rail including a first top surface portion and a spaced apart second top surface portion with a third recessed portion in-between and having an arcuate tip respectively extending from the recessed portion to the first and second top surface portions of the first raised stabilizer rail, and said opposite second longitudinal sidewall has a second raised stabilizer rail having a top surface aligned with the first and second top surface portions of the first stabilizer rail;

f. said base further comprising a horizontal flat plate section having a top surface and a back surface and extending between said front wheel housing member and said rear wheel housing member with said flat plate section having a saw blade penetration opening which is bounded by an interior sidewall extending from the top surface to the bottom surface;

g. a first damping strip on the top surface and a spaced apart second damping strip on the top surface and located between and parallel to said second longitudinal sidewall and said saw blade penetration opening;

h. said front side having a front slot with a plate threaded bolt to retain a portion of a front of a saw blade plate and an offset cutting guide first slot, said front side having a cutting guide second slot with a threaded bolt retaining member, the slots parallel to each other;

i. a cutting guide having a longitudinal flat frame with a front end and a rear end, a transverse wheel housing located between the front end and rear end of the longitudinal frame, a handle beginning at the rear end and extending to the wheel housing, the longitudinal flat frame of the cutting guide extending through the first slot and the second slot and retained in position by the threaded bolt;

j. a side retaining member located on the second longitudinal sidewall opposite to the side of the rear retaining member and having a rubber foot attached by a tether; and k. the saw flat plate retained at its front end by the plate threaded bolt, the saw plate retained at its rear end by said upwardly sloped rear retaining member, and the saw blade retained on one side by said side retaining member.

In addition to the features set forth above, the present invention also has the following features:

The rolling plate assembly adapted for attachment to a rotary power saw having a rotary power saw flat plate and a rotating saw blade, as described in detail above, further comprising: said base contains at least one flat stabilizer rail located between said first longitudinal sidewall and said second longitudinal sidewall.

Key innovative features of the present invention are: (1) a rollable plate assembly having removable wheels which can be quickly replaced and having each respective wheel adjacent the respective leading edge and the respective trailing edge of its retaining housing and partially extending below the housing; this arrangement enables the power tool to be lifted off the surface of the workpiece and to facilitate a smooth rolling motion of the power tool on the workpiece; (2) a guide mechanism which is affixed to the rolling plate assembly and has a rolling motion along the vertical surface of the workpiece in which the horizontal surface is being cut or otherwise operated on, to thereby facilitate a straight line motion of the power tool and reduce torsional rotation and kickback of the power tool; and (3) the base of the rolling plate assembly is made out of a single piece of injection molded fiber enriched plastic so that the torsional strength of the base plate is significantly improved. One example of the fiber enriched plastic is fiber enriched high-impact nylon.

Defined in great detail, the worm drive embodiment of the present invention is a rolling plate assembly adapted for attachment to a rotary power saw having a rotary power saw flat plate and a rotating saw blade, the rolling plate assembly comprising:

a. a base formed out of a single piece of fiber enriched high-impact nylon, the base including a top front side having a front saw retaining member and a front guide retaining member and a front back side having a front wheel housing member removably retaining a front heel;

b. said base also including a rear side with a rear back side having a rear wheel housing removably retaining a rear wheel, the rear wheel parallel to the front wheel;

c. said rear section connected to said front guide retaining member on a first side by a first longitudinal sidewall and said rear section connected to said front saw retaining member on an opposite side by a parallel oppositely disposed second longitudinal sidewall;

d. said rear section includes a rear retaining housing member with said rear retaining housing member including a longitudinal slot through which a rear flat retaining rod having a flat rectangular shaped section slidably extends, the flat rectangular shaped section extending to a downwardly sloped section and the extending to an upwardly sloped section having a sloped lower surface, a threaded bolt which extends through a first threaded opening in the rear retaining housing member;

e. said first longitudinal sidewall has a first raised stabilizer rail including a first top surface portion and a spaced apart second top surface portion with a third recessed portion in-between and having an arcuate tip respectively extending from the recessed portion to the first and second top surface portions of the first raised stabilizer rail, and said opposite second longitudinal sidewall has a second raised stabilizer rail having a top surface aligned with the first and second top surface portions of the first stabilizer rail;

f. said base further comprising a horizontal flat plate section having a top surface and a back surface and extending between said front wheel housing member and said rear wheel housing member with said flat plate section having a saw blade penetration opening which is bounded by an interior sidewall extending from the top surface to the bottom surface;

g. a first damping strip on the top surface and a spaced apart second damping strip on the top surface and located between and parallel to said second longitudinal sidewall and said saw blade penetration opening;

h. said front side having a front slot with a plate threaded bolt to retain a portion of a front of a saw blade plate and an offset cutting guide first slot, said front side having a cutting guide second slot with a threaded both retaining member, the slots parallel to each other;

i. a cutting guide having a longitudinal flat frame with a front end and a rear end, a transverse wheel housing located between the front end and rear end of the longitudinal frame, a handle beginning at the rear end and extending to the wheel housing, the longitudinal flat frame of the cutting guide extending through the first slot and the second slot and retained in position by the threaded bolt;

j. a side retaining member located on the second longitudinal sidewall opposite to the side of the rear retaining member and having a rubber foot attached by a tether; and k. the saw flat plate retained at its front end by the plate threaded bolt, the saw plate retained at its rear end by said upwardly sloped rear retaining member, and the saw blade retained on one side by said side retaining member.

In addition to the features set forth above, the present invention also has the following features:

The rolling plate assembly adapted for attachment to a rotary power saw having a rotary power saw flat plate and a rotating saw blade, as described in detail above, further comprising: said base contains at least one damping strip located between said first longitudinal sidewall and said second longitudinal sidewall.

The rolling plate assembly adapted for attachment to a rotary power saw having a rotary power saw flat plate and a rotating saw blade as described in detail above, further comprising: located between and parallel to said first longitudinal sidewall and said opening on said flat plate section are a first flat damping strip on the top surface and a spaced apart second damping strip on the surface.

The rolling plate assembly adapted for attachment to a rotary power saw having a rotary power saw flat plate and a rotating saw blade, as described in detail above, further comprising: said base is made from a material selected from the group consisting of injection molded fiber enriched plastic, high-impact nylon, and metal.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Sidewinder/Right Sided Saw Blade

Figure 1:
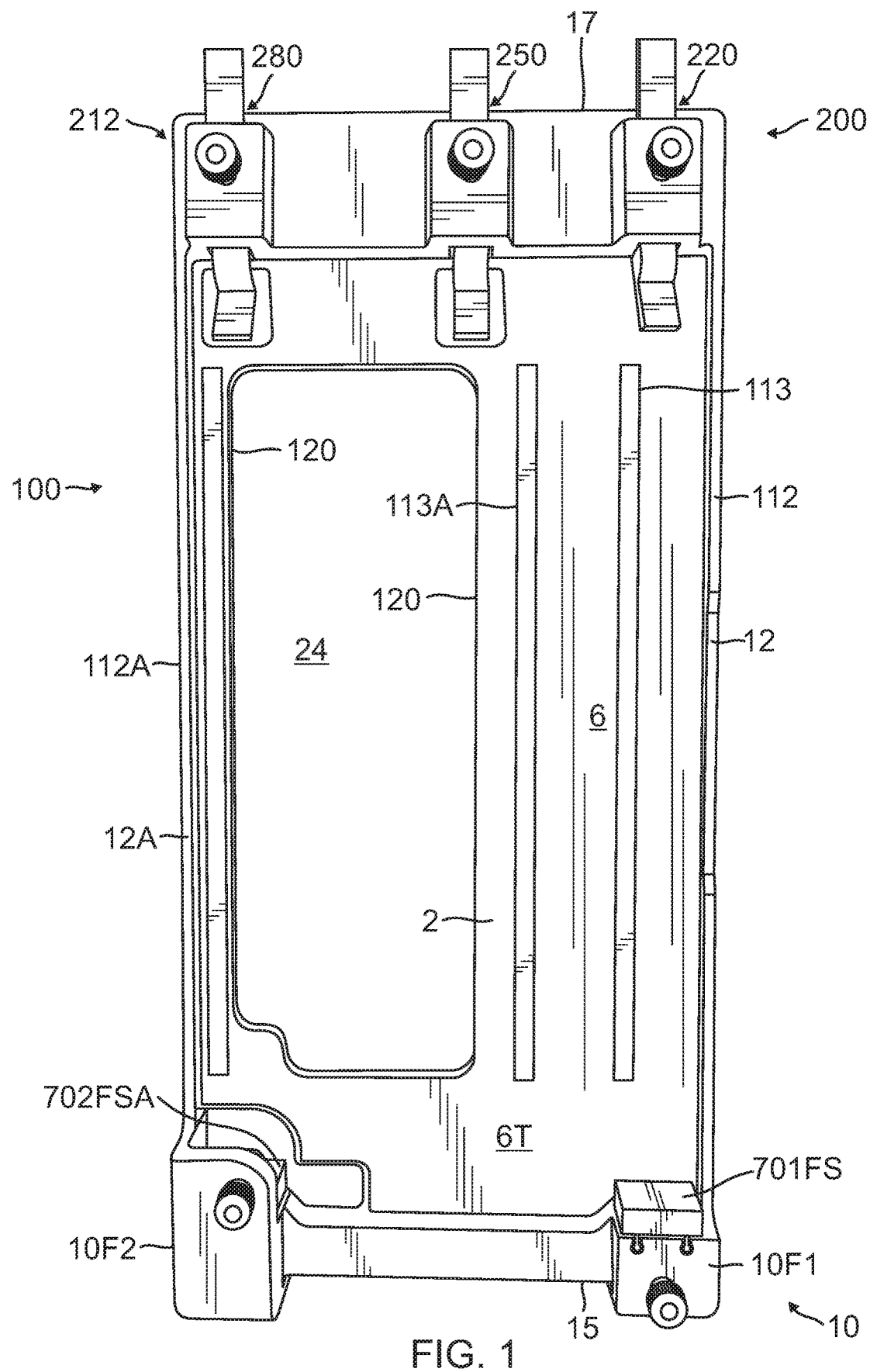
FIG. 1 is a top plan view of the improved rolling plate assembly without the cutting guide inserted and without a power saw retained.
Figure 2:
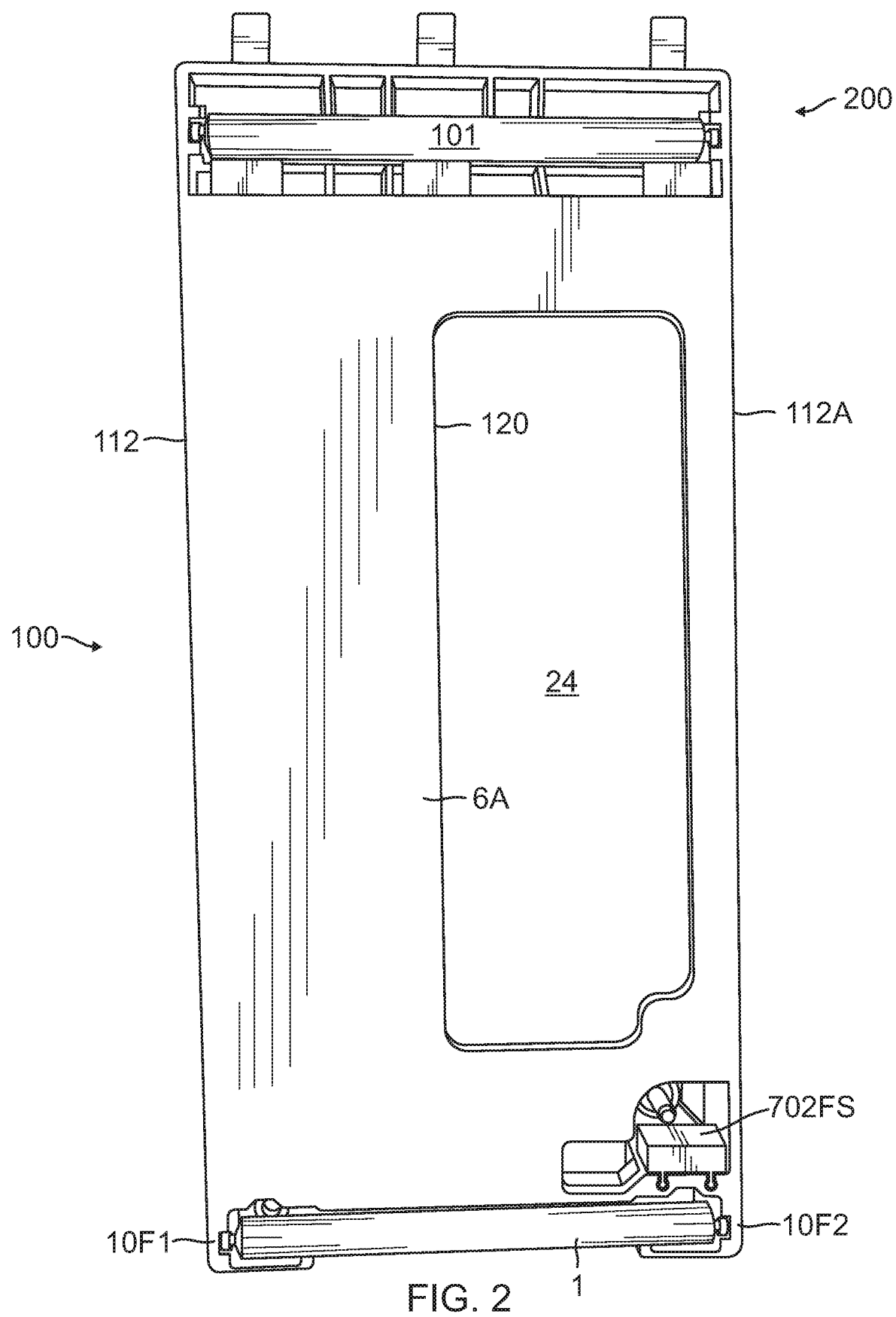
FIG. 2 is a bottom plan view of the improved rolling plate assembly without the cutting guide inserted and without a power saw retained.

Referring to FIG. 1, there is illustrated a top plan view of the improved rolling plate assembly 100 without the cutting guide inserted and without a power saw retained. Referring to FIG. 2, there is illustrated a bottom plan view of the improved rolling plate assembly 100 without the cutting guide inserted and without a power saw retained.

Figure 3:
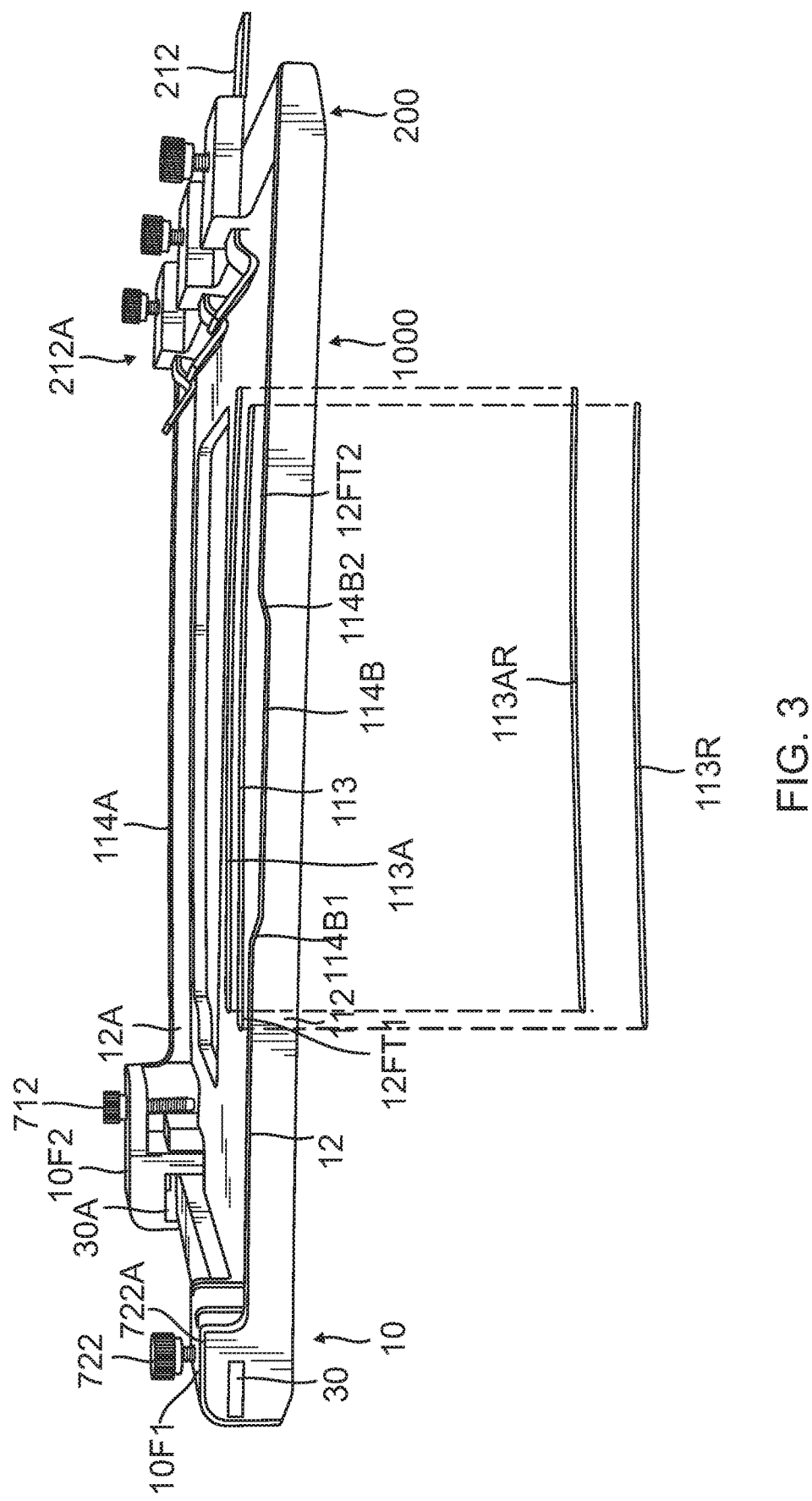
FIG. 3 is a left side elevational view of the improved rolling plate assembly without the cutting guide inserted and without a power saw retained, with longitudinal indented damping markers illustrated and rubber damping strips shown in an exploded view.

Referring to FIG. 3, there is illustrated a left side elevational plan view of the improved rolling plate assembly 100 without the cutting guide inserted and without a power saw retained.

Referring to FIG. 1, a significant improvement of the present invention rolling plate assembly 100 is that the base or skate plate 2 is formed or molded out of a single piece of fiber reinforced plastic. The base 2 of the improved rolling plate assembly 100 assembly has a front side 15 comprising a first housing retaining member 10F1 and a second housing retaining member 10F2. As will be discussed in greater detail in FIGS. 6 and 7, the second housing retaining member 10F2 retains a front section 510 of a rotary power saw plate 500 and the first housing retaining member 10F1 retains a cutting guide.

Referring to FIGS. 1 and 2, the one-piece constructed base 2 has a front side 15 that includes a front wheel housing member 10 and a rear side 17 that includes a second parallel rear wheel housing member 200. Base 2 further has a rear section 212 that extends horizontally across base 2 that contains rear retaining housing members 220, 250, and 280. Rear section 212 is connected to first housing retaining member 10F1 on a first side by a first longitudinal sidewall 112 which has a first raised stabilizer rail 12. Rear section 212 is also connected to second housing retaining member 10F2 by a parallel oppositely disposed second longitudinal sidewall 112A which has a second raised stabilizer rail 12A.

Referring to FIGS. 1 through 4, first raised stabilizer rail 12 on sidewall 112 has a top surface having a first portion 12FT1 and a spaced apart second portion 12FT2 with a reduced wall 114B in between 12FT1 and 12FT2. The reduced portion 114B has a first arcuate lip 114B1 to align it with first top portion 12FT1 and a second arcuate lip 114B2 to align it with second top portion 12FT2. The opposite side has a straight stabilizer rail 114A. A portion of the base 2 is further comprised of a horizontal flat plate section 6 extending between front wheel housing member 10 and rear wheel housing member 200. Formed into flat plate section 6 area pair of parallel stabilizer rails including a first flat stabilizer rail 13 and a second flat stabilizer rail 13A. Second flat stabilizer rail 13A is located closer to second longitudinal sidewall 112A.

The flat plate 6 extends for the entire interior area bounded by the front wheel housing member 10, the rear wheel housing member 200, the first longitudinal sidewall 112 and the second longitudinal sidewall 112A. Formed into the flat plate 6 is a saw blade penetration opening 24 which is bounded on all interior sides by interior sidewall 120 which extends perpendicularly downward from the top 6T of flat plate section 6 and terminates in the bottom 6A of the flat plate section 6. All of these components of the base 2 including front wheel housing member 10, rear wheel housing member 200, the first longitudinal sidewall 112, first raised stabilizer rail 12, the second longitudinal sidewall 112A, second raised stabilizer rail 12A, flat plate section 6, bottom 6A, interior circumferential wall 120, and first flat longitudinal indented damping strip marker 113 and a second indented longitudinal damping strip marker 113A are all formed of a single piece of material which preferably is injection molded fiber enriched high-impact nylon. In addition, spaced over each of the respective embedded damping strip markers, is a respective first damping strip 113R and over embedded damping strip marker 113A is a second damping strip 113R which serve to grip the saw plate as it is in motion and also serves to dampen the vibration of the saw plate against the present invention as it is moving. The damping strips 113R and 113AR also serve to provide a stabilizing grip on the saw plate and reduce torsional motion. Each damping strip 113R and 113AR is each preferably made of rubber. This design greatly simplifies the frame assembly as described in the patents identified in the prior art section of this patent application, eliminating many separate component parts and greatly reducing the cost of manufacture and assembly. The injection molded plastic provides much lighter weight and reduced manufacturing costs as compared to a metal base. It is possible to make the base 2 and all of its components out of metal or any other suitable material such as high-impact nylon. A first rubber damping strip 113R is glued or otherwise affixed into longitudinal indented marker 113. A second damping strip 113AR is glued or otherwise affixed into longitudinal indented marker 113A. First damping strip 113R and second damping strip 113AR are preferably made of rubber. The damping strips provide additional gripping to the saw plate and reduce sliding of the saw plate and kickback of the saw.

Figure 4:
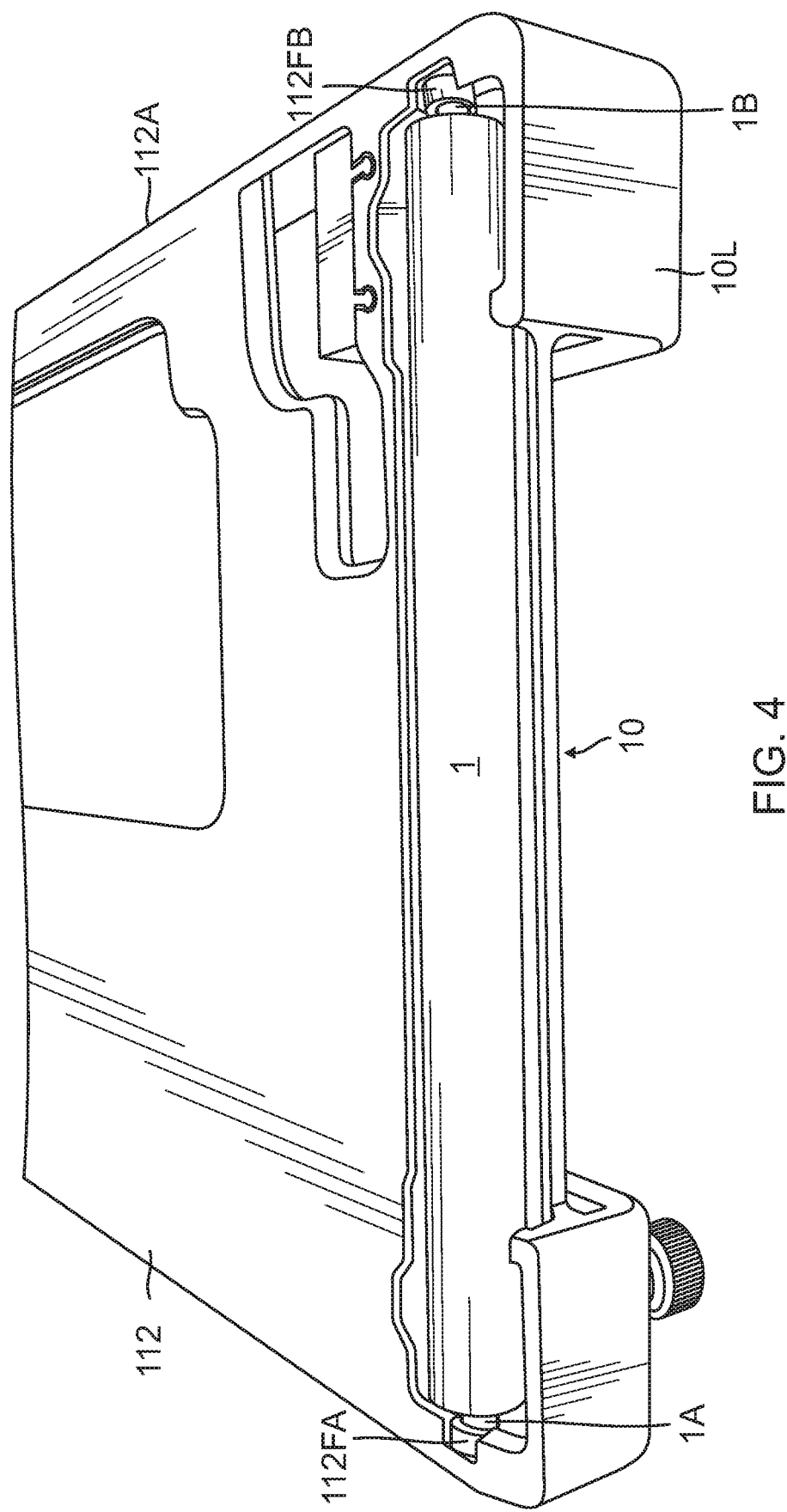
FIG. 4. is a close-up bottom perspective view of the front bottom of the base illustrating the front rolling wheel.
Figure 5:
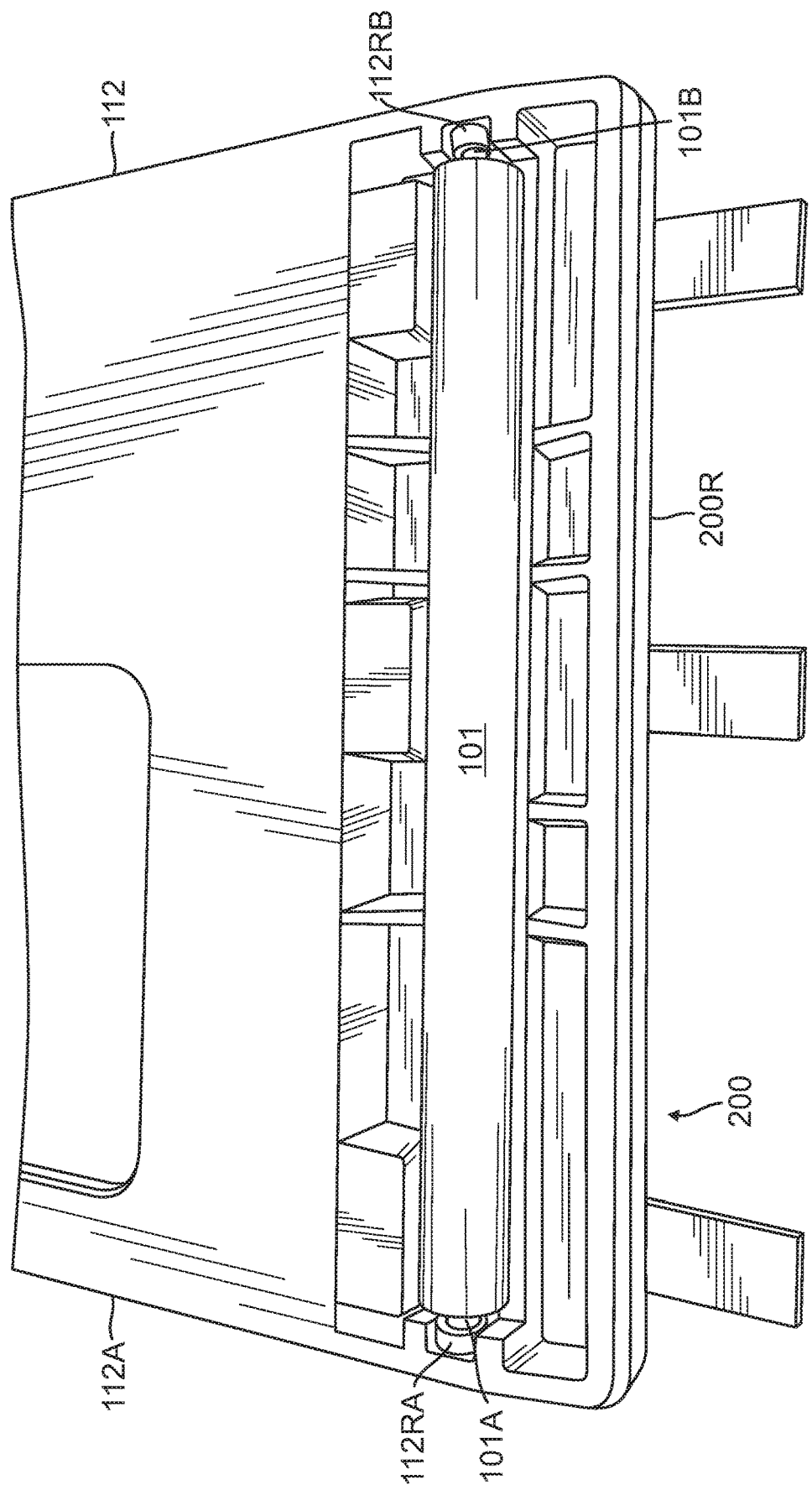
FIG. 5 is a close-up bottom perspective view of the rear bottom of the base illustrating the rear rolling wheel.

An additional significant improvement in the present invention rolling plate assembly 100 is the redesign of the wheels and how they are retained in the front wheel housing member 10 and second rear housing member 200 which will now be described in detail. Referring to FIG. 4, there is illustrated a close-up bottom perspective view of the front bottom of the base illustrating the front wheel assembly. Referring to FIG. 5, there is illustrated a close-up bottom perspective view of the rear bottom of the base 2 illustrating a rear rolling wheel assembly. Referring to FIGS. 4 and 5, front rolling wheel 1 is located below and extends behind and below a leading edge 10L of front wheel housing 10. Similarly, rear rolling wheel 101 is located below and extends behind and below the rear edge 200R of rear wheel housing 200. By having one long wheel 1 instead of two shorter aligned wheels in the front and one long wheel 101 instead of two shorter aligned wheels in the rear, there is more rolling surface for the improved rolling plate assembly 100. As a result, there is more friction of the wheels 1 and 101 against the surface on which it rolls and therefore this increased wheel length and additional frictional surface provides more stability to the improved rolling plate assembly 100 so that the improved rolling plate assembly 100 will not veer out of the cutting line as a cut is being made.

Referring to FIGS. 4 and 5, in addition to the improvement in the length of a single wheel 1 or 101, the method of attachment and removal of each wheel is also significantly improved. Front rolling wheel 1 is removably retained in wheel retainer 112FA by pin 1A and wheel retainer 112FB by pin 1B. Referring to FIG. 5, rear rolling wheel 101 is removably retained in wheel retainer 112RA by pin 101A and wheel retainer 112Rb by pin 101B. The flexibility of the fiber reinforced resin of the components of the base 2 enables the front rolling wheel 1 and the rear rolling wheel 101 to be removed.

In the preferred embodiment, the wheels 1 and 101 are made of rubber or other material which can achieve a traction and protection on a smooth surface. In one embodiment, each wheel can be approximately one-half (½) inch in diameter and therefore extends by approximately one-eighth (⅛) inch below the lower surface of the housing members 10 and 200. The wheel diameters can range between three-eighths (⅜) of an inch to three-quarters (¾) of an inch. The wheels 1 and 101 are preferably made of rubber but can also be made of other materials such as polyurethane. The key feature of the wheels 1 and 101 is that they must be made of materials which have good lateral traction on a smooth surface such as a piece of plywood or a 2×4. One problem discussed in the prior art is that a smooth plate affixed to the rotary power saw can slip sideways and cause binding of the rotary saw which results in kickback. The traction of the present invention wheels significantly reduces any lateral movement of the rotary power saw as it cuts through a workpiece and thereby significantly reduces the possibility of kickback. In addition, by having the wheels 1 and 101 within the housings 10 and 200, the strength of the attachment of the wheels is increased since the weight of the saw pushes down on the assembly to help retain the wheels within the assembly as the saw is moved.

Figure 6:
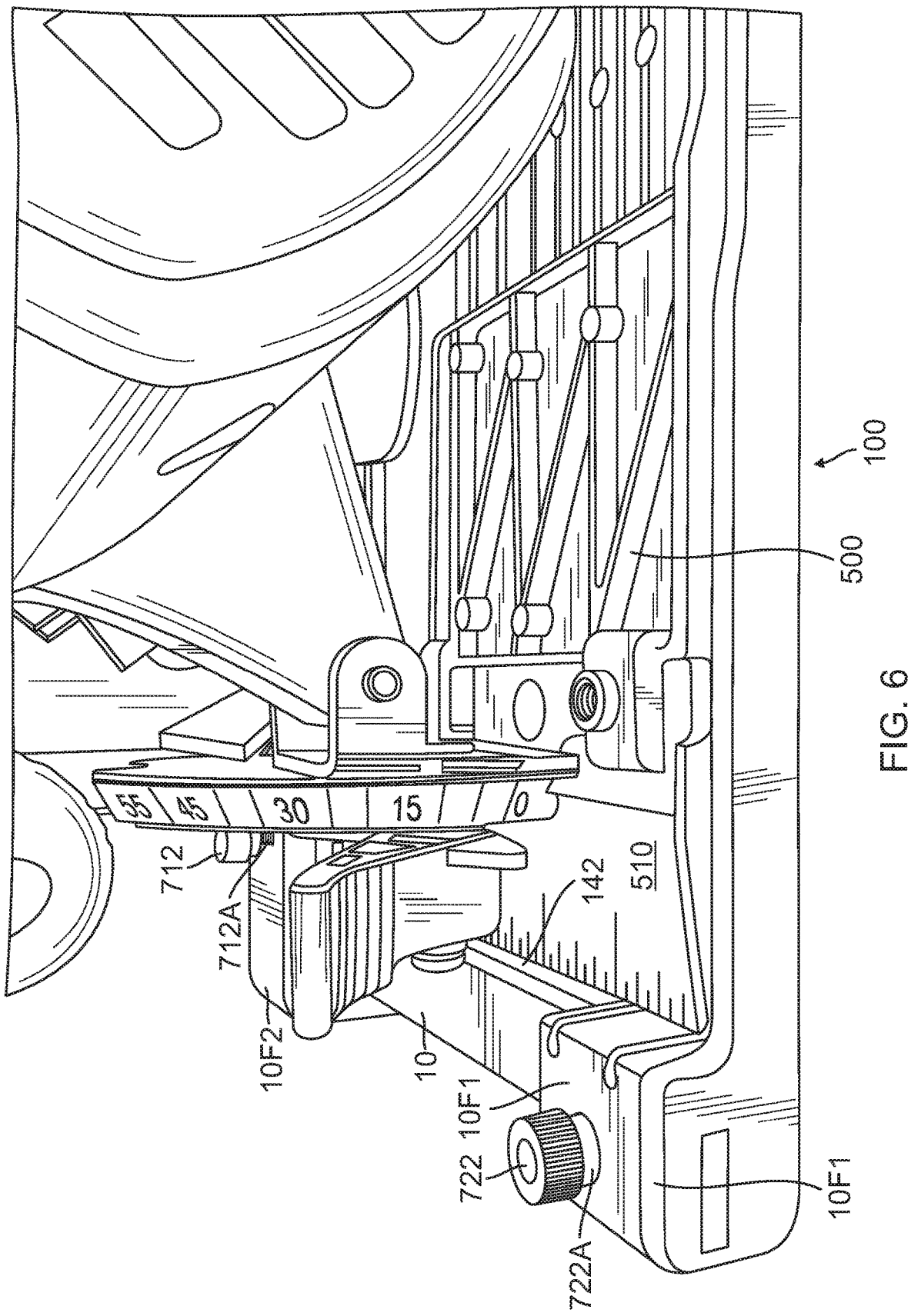
FIG. 6 is a close-up top perspective view of the front of a power saw plate retained by front retaining members of the rolling plate assembly.

The second significant improvement in the present invention rolling plate assembly 100 is the apparatus by which the cutting tool is retained. The means by which a rotary power saw is attached to the rolling plate assembly will now be described. First, the means by which the rotary power saw is attached to the front of the rolling plate assembly will be described. Referring to FIG. 6, there is illustrated a close-up top perspective view of the front of a power saw plate retained by front retaining members of the rolling plate assembly 100.

Figure 7:
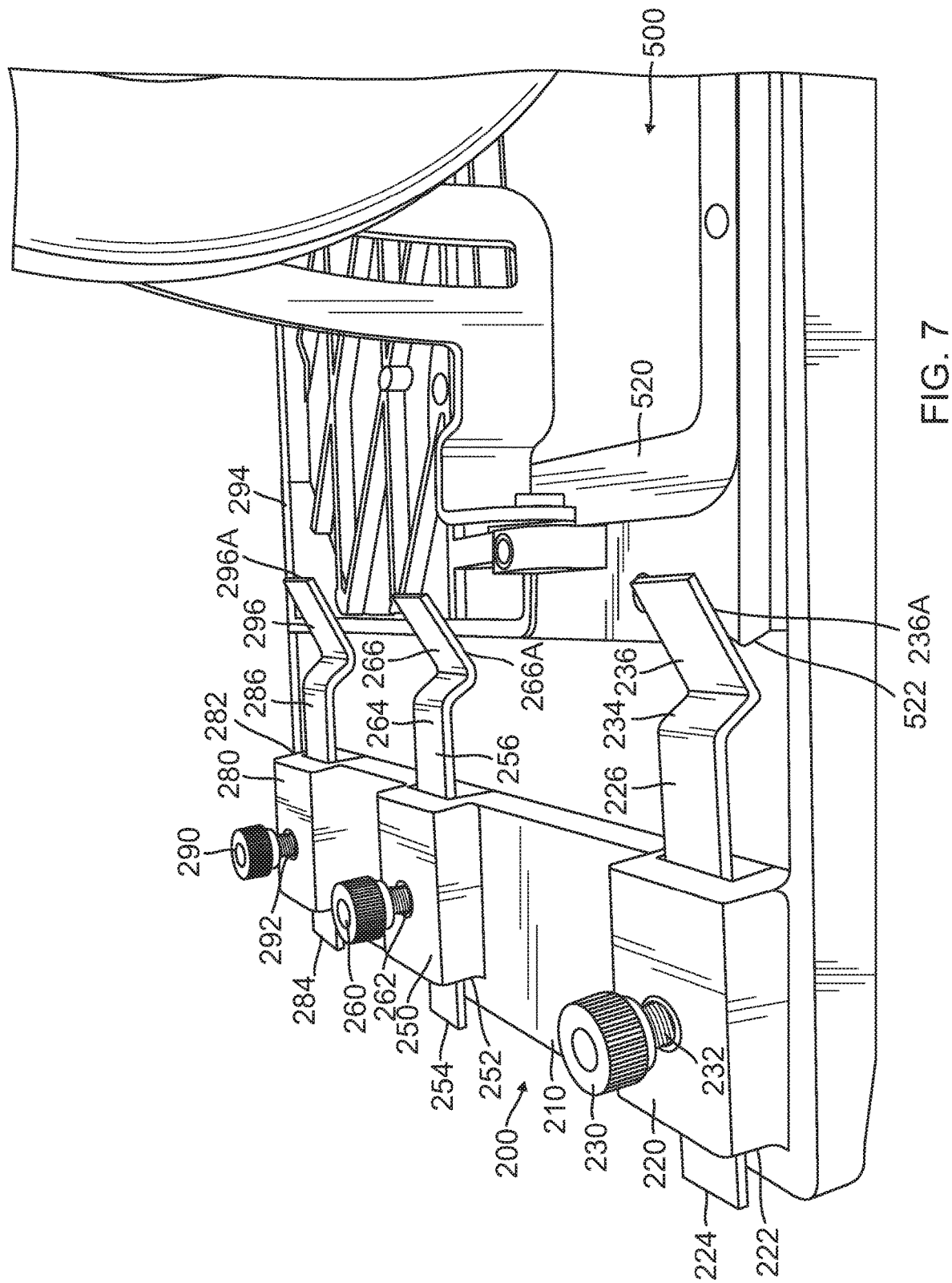
FIG. 7 is a close-up top perspective view of the rear of a power saw plate retained by rear retaining members of the rolling plate assembly.

Further referring to FIG. 6, there is illustrated a close-up top perspective view of the front of a power saw plate 500 retained by front retaining members of the rolling plate assembly 100. The power saw plate 500 has a front end 510 inserted into a slot 142 beneath first housing retaining member 10F1 and beneath second housing retaining member 10F2. Only first housing retaining member 10F1 assists in retaining the saw plate 500. Second housing retaining member 10F2 retains a cutting guide 71 (illustrated in FIG. 9) in place. First housing retaining member 10F1 retains a front end 510 of power saw plate 500 by a first front threaded bolt 712 which extends through a first front threaded opening 712A in first the housing retaining member 10F1. Second housing retaining member 10F2 of the rolling plate assembly 100 has a second front threaded bolt 722 that extends through a second front threaded opening 722A of the rolling plate assembly 100 to retain the cutting guide 71 (illustrated in FIG. 9) in place. The second front thread bolt 722 extends through the second front threaded opening 722A to tighten and retain in place cutting guide 71, Referring to FIG. 7, there is illustrated a close-up top perspective view of the rear of a power saw plate retained by rear retaining members of the rolling plate assembly. As illustrated in FIG. 7, the power saw plate 500 has a rear end 520 retained by three spaced apart slidably retained flat rods, each having a respective upwardly sloped end to facilitate retention of the rear end 520 of the power saw flat plate 500. A rear housing assembly 200 includes a flat base 210 supporting three spaced apart rear retaining housing members 220, 250, and 280. First rear retaining housing member 220 includes a first longitudinal slot 222 through which a first rear flat retaining rod 224 having a flat rectangular shaped section 226 slidably extends through slot 222. A first rear threaded bolt 230 extends through a threaded opening 232 in first rear retaining housing member 220 to tighten the location of first rear flat retaining rod 222. First rear flat retaining rod 224 has a downwardly sloped section 234 extending to an upwardly sloped section 236. The rear edge 522 of the rear section 520 of saw plate 500 abuts against a lower surface 236A of upwardly sloped section 236.

Similarly, second rear retaining housing member 250 includes a second longitudinal slot 252 through which a second rear flat retaining rod 254 having a flat rectangular shaped section 256 slidably extends through slot 252. A second rear threaded bolt 260 extends through a threaded opening 262 in second rear retaining housing member 250 to tighten the location of second rear flat retaining bolt 260. Second rear flat retaining rod 254 has a downwardly sloped section 264 extending to an upwardly sloped section 266. The rear edge 522 of the rear section 520 of the power saw plate 500 abuts against a lower surface 266A of upwardly sloped section 266.

Similarly, third rear retaining housing member 280 includes a first longitudinal slot 282 through which a third rear flat retaining rod 284 having a flat rectangular shaped section 286 slidably extends through third longitudinal slot 282. A third rear threaded bolt 290 extends through a threaded opening 292 in third rear retaining housing member 280 to tighten the location of third rear flat retaining rod 282. The rear flat retaining rod 282 has a downwardly sloped section 294 extending to an upwardly sloped section 296.

The rear edge 522 of the rear section 520 of the power saw plate 500 abuts against a lower surface 296A of upwardly sloped section 296.

The three rear housing members 220, 250 and 280 each serve a dual purpose. First, the slotted assembly enables the distance of each flat retaining rod to be moved forward and backward to adjust for different lengths of power saw plates 500 and in particular, can be adjusted in a forward or rearward direction to accommodate different lengths of the power saw plate 500. In addition, the upwardly sloped sections 236, 266 and 296 serve to accommodate different thicknesses of power saw plate 500. The rear end 520 abuts against the upwardly sloped sections 236, 266 and 296. The ability to slide back and forth to adjust the distance of the slope sections accommodates different lengths of power saw plates 500. Accordingly, when the power saw plate is placed on the present invention, the three retaining housing assemblies are adjusted to accommodate different lengths of power saw plates and also adjusted to accommodate the different thicknesses of the power saw plates so that the rear 520 of the power saw plate abuts against the upwardly extending sloped sections 236, 266 and 296 so that the rear end 522 of the power saw plate 520 is secured abutting against the sloped sections. The respective first, second and third threaded bolts 230, 260 and 290 are then tightened.

In addition, referring to FIGS. 1 and 2, first housing retaining member 10F1 includes an optional first spacer 701FS and second housing retaining member 10F2 includes a second optional spacer 702FSA to adjust the rolling plate assembly 100 to allow for shorter front sections of power saw plate 500. Optional first spacer 701FS is spaced on top surface 6 and second optional spacer 702FSA is inserted from bottom surface 6A. The widths and lengths of these spacers can vary, but it is within the spirit and scope of this invention for these spacers to be a multitude of sizes and shapes The widths and lengths of these spacers can vary, but it is within the spirit and scope of this invention for these spacers to be a multitude of sizes and shapes that will fit within the rolling plate assembly and allow for the rolling plate assembly to be used with smaller power saws. Typically, the spacers will have a fixed height and width that correspond to the approximate height and width of the adjacent housing retaining member. The length measured from the distance between the housing retaining member and extending longitudinally can vary. Typically, this length has a range from 0.25 inches to 3 inches.

Figure 8:
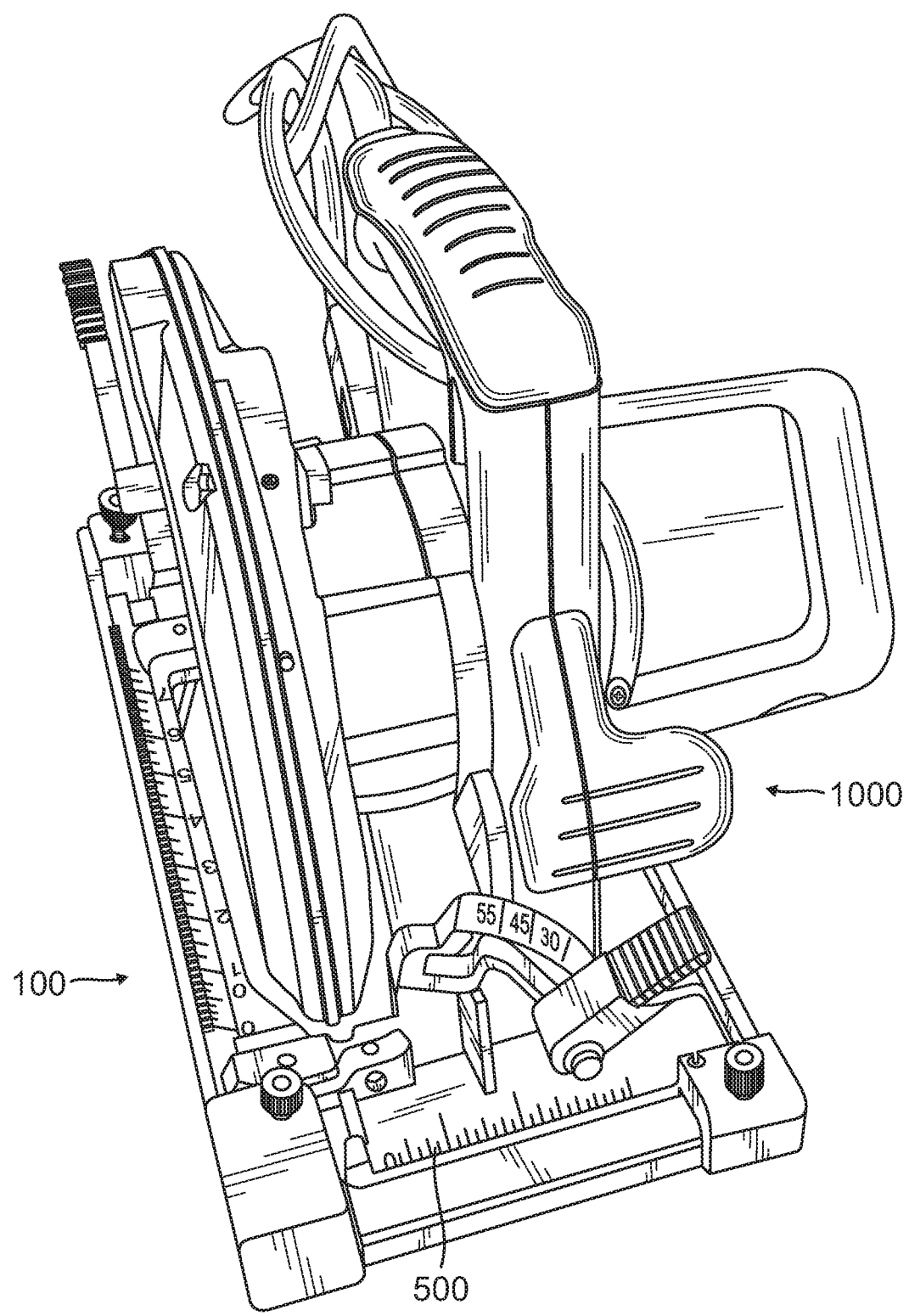
FIG. 8 is a top-front perspective view of a power saw attached the rolling plate assembly by the front and rear of the power saw plate.

Referring to FIG. 8, there is illustrated a top front perspective view of a power saw 1000 with its power saw plate 500 retained on the rolling plate assembly as just described. The front wheel housing member 10 and rear wheel housing member 200 support the power saw between wheels 1 and 101, so that the entire width of the saw is supported by the wheels during cutting.

Figure 9:
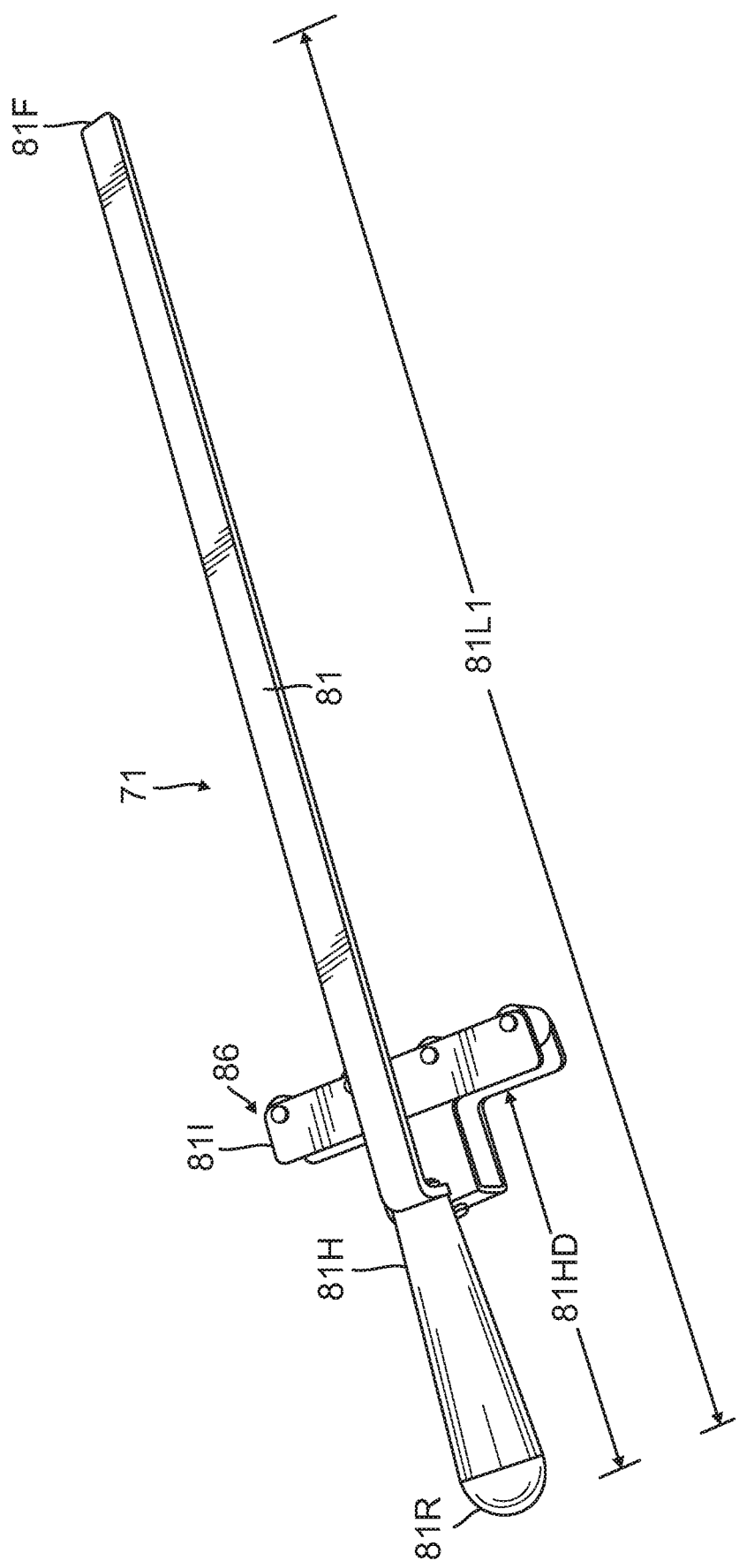
FIG. 9 is a top perspective view of the cutting guide.

The third significant improvement in the present invention rolling plate assembly 100 is the addition of a cutting guide 71 which will now be described in detail. Referring to FIG. 9, there is illustrated a top perspective view of the cutting guide 71 having a longitudinal frame 81 having a length 81L1. The cutting guide 71 includes a transverse wheel housing 86 located at a distance 81HD from rear end 81R. The cutting guide has a front end 81F and a rear end 81R. The transverse wheel housing 86 is located between front end 81F and rear end 81R of the longitudinal frame 81. The handle 81H of the longitudinal frame 81 begins at the rear end 81R and extends for the distance 81HD. The cutting guide 71 facilitates a straight and even cut.

Referring to FIG. 3, cutting guide slots 30 and 30A, cutting guide slots 30 and 30A are respectively formed into first housing retaining member 10F1 and second housing retaining member 10F2. Second front threaded opening 722A in second housing retaining member 10F2 is aligned with cutting guide slot 30. Second front threaded bolt 722 is used to affix the cutting guide frame 81 of the cutting guide 71 inserted through aligned slots 30 and 30A.

Figure 10:
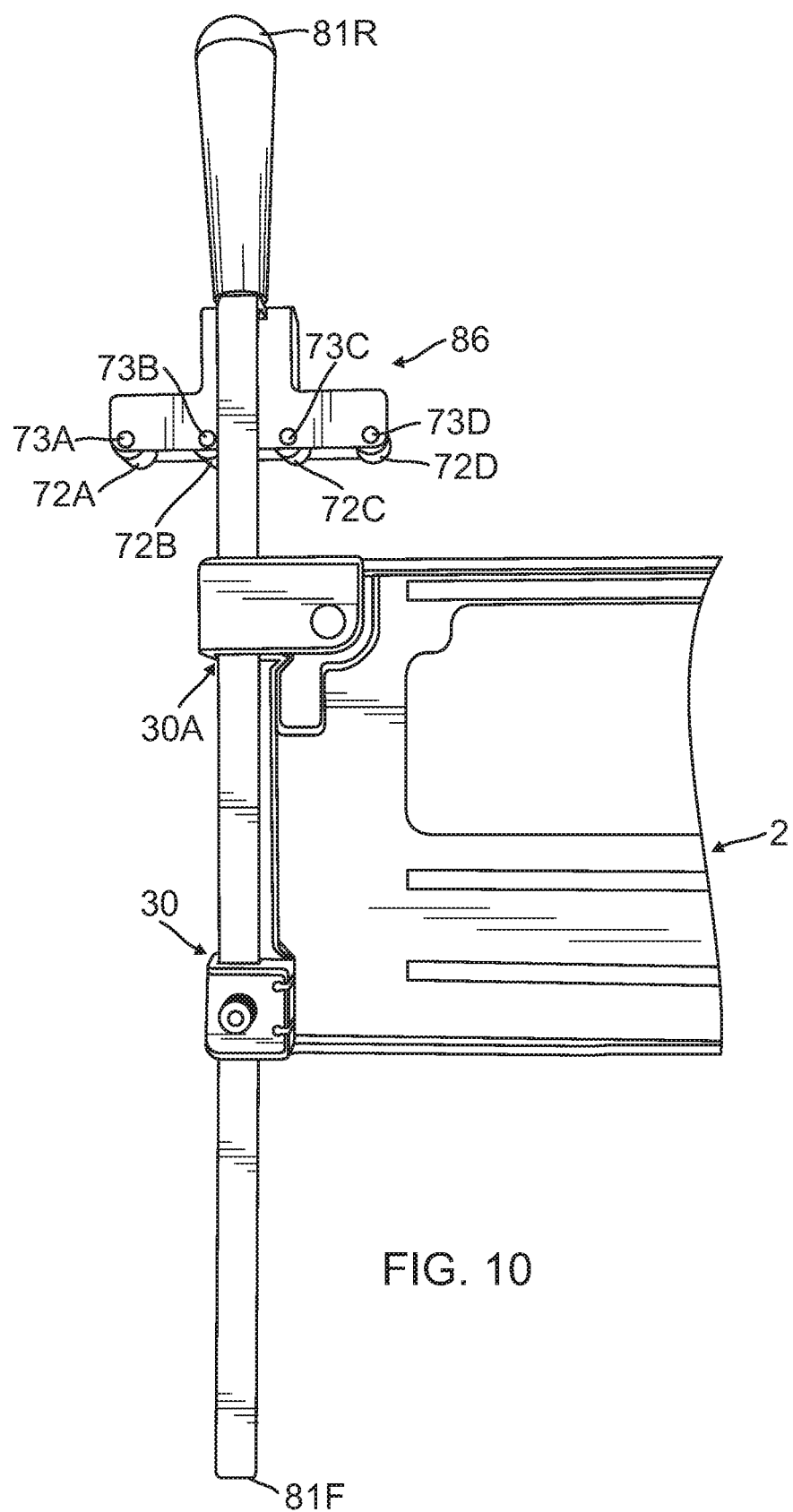
FIG. 10 is a closeup view of the cutting guide installed in the base and extending through aligned slots in the base.
Figure 11:
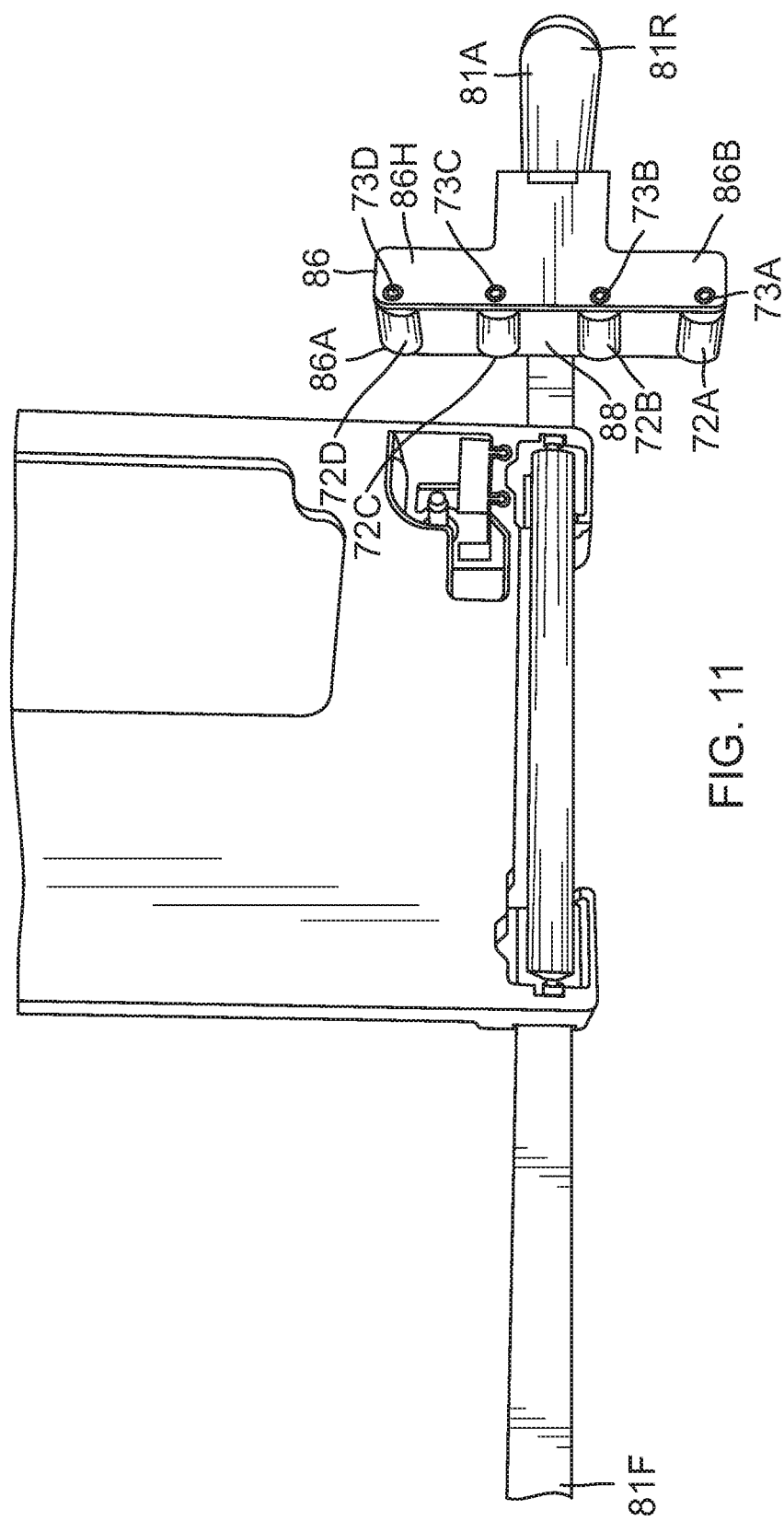
FIG. 11 is a bottom perspective view of the cutting guide installed in the base and extending through aligned slots in the base.

Referring to FIG. 10, there is illustrated a top close-up top plan view of the cutting guide 71 installed in the base 2 and extending through aligned slots 30 and 30A. Referring to FIG. 11, there is illustrated a bottom close-up plan view of the cutting guide 71 installed in the base 2 and extending through aligned slots. 30 and 30A. Referring to FIG. 11, there is illustrated a bottom close-up perspective view of the cutting guide 71 installed in the base 2 and extending through aligned slots 30 and 30A. The cutting guide 71 comprises a guide frame 81 connected to a transverse wheel housing unit 86 which has a top wall 86H and a bottom wall 86B. In addition, the wheel housing unit 86 includes longitudinal gap 88 retaining four (4) spaced apart wheels 72A, 72B, 72C and 72D. Each wheel 72A, 72B, 72C and 72D, has a respective longitudinal opening which respectively rotatably receive a pin 73A, 73B, 73C and 73D. Each pin extends through parallel spaced apart openings in top wall 86A and bottom wall 86B of housing 86.

Figure 12:
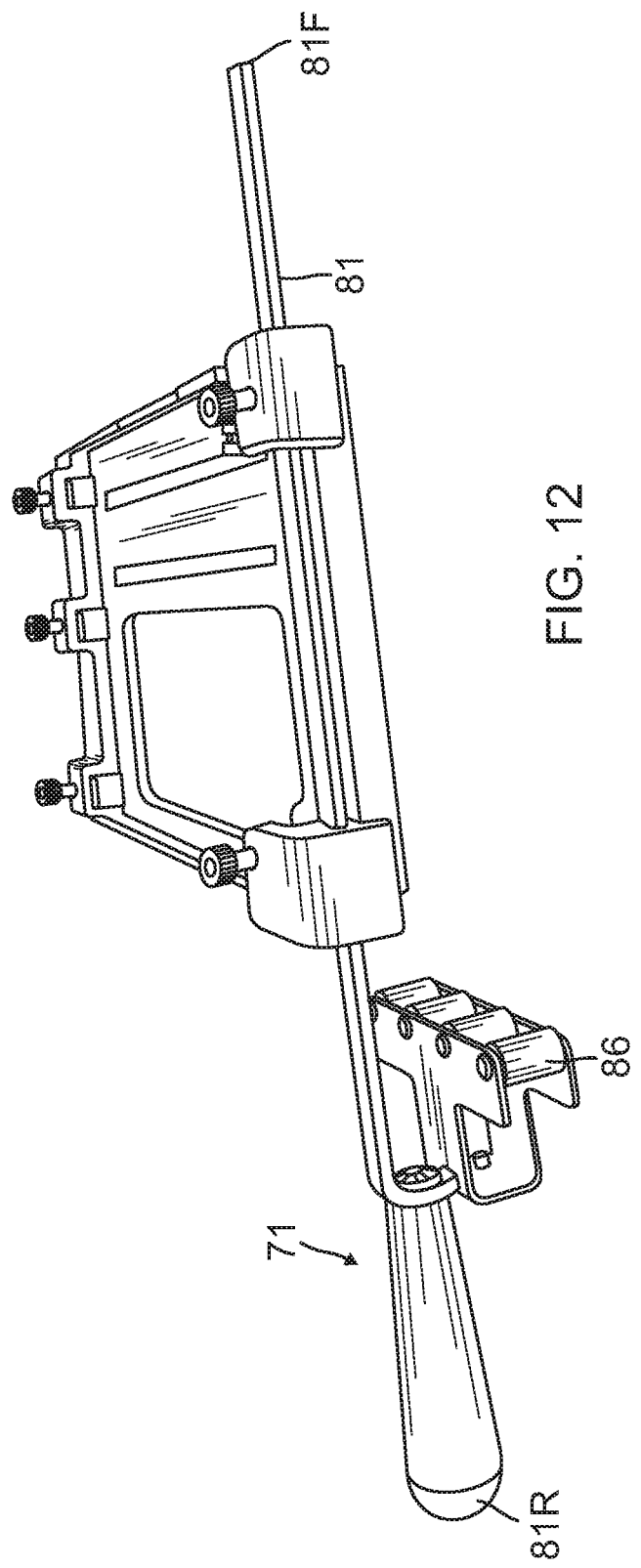
FIG. 12 is a front perspective view of the cutting guide installed in the base and extending through aligned slots in the base.

The cutting guide 71 is illustrated as installed in use in FIGS. 10 through 12. Cutting guide frame 81 is inserted through slots 30 and 30A and is tightened by cutting guide fix bolt 722. In operation the location of the cut to be made is determined and the cutting guide frame 81 fixed so that rotating wheels 72A, 72B, 72C, and 72D abut against the vertical side of the piece to be cut so that as the saw blade is moved, it will be forced to move in a straight line, provided the vertical surface is straight, as the wheels properly align the saw blade 1500 during a cut. The wheel housing is reversible so that the rotating wheels 72A, 72B, 72C and 72D face in the opposite direction toward rear end 81R.

Figure 13:
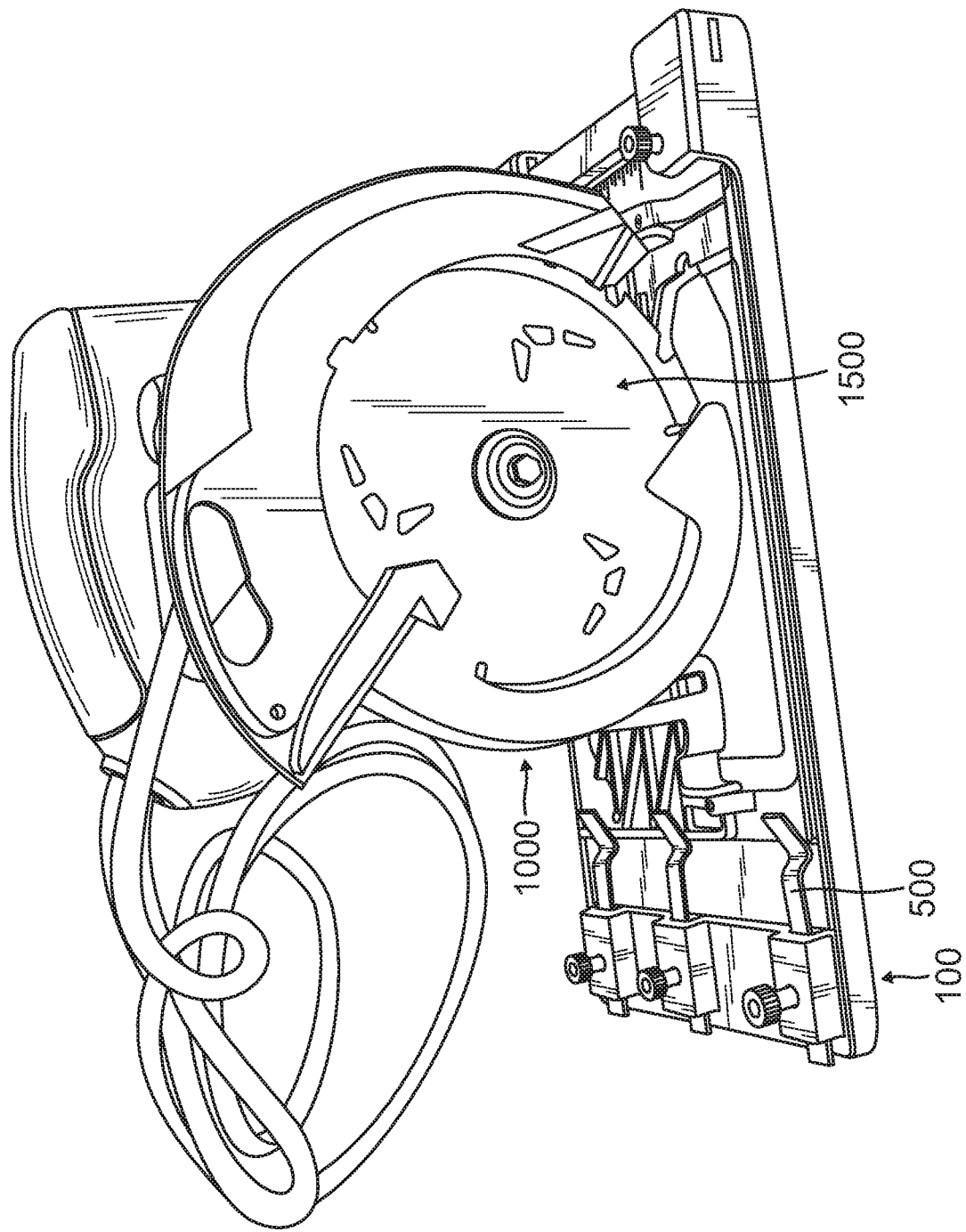
FIG. 13 is a side elevational view of a power saw retained in the present invention rolling plate assembly.

Referring to FIG. 13, there is illustrated a side elevational view of a power saw 1500 retained in the present invention rolling plate assembly 100. Through the present invention, the improved rolling plate assembly 100 is one completed unit and is easily and quickly attached to the front and back of a rotary power saw. Its rectangular design provides stability to the power saw as it cuts through a workpiece. The improved rolling plate assembly 100 protects the work surface by elevating the assembly above the work surface by a portion of the diameter of the wheels 1 and 101 so that the rotary power saw 1500 can easily roll on the work surface and will not scratch the work surface. This is especially important when the work surface is made of a fine finished surface such as veneer finished woods, marble, granite, etc. In addition to reducing kickback, the strong traction of the wheels helps to absorb the vibration generated by the rotary power saw and enables the user to make easy straight cuts.

The present invention improved rolling plate assembly 100 is a substantial improvement over the prior design in that it comprises a simple yet efficient frame structure to quickly and removably support a pair of rolling wheels 1 and 101. The current power saws come with a mechanisms to quickly adjust the angle of orientation of the saw blade to any desired cut within an arc of 55 degrees. The rolling plate assembly 100 further comprises a cutting guide to assure that all cuts will be straight. The smooth action of the wheels 1 and 101 combined with the steady movement assured by the cutting guide 71 significantly reduces kickback of the saw and substantially increases the speed, accuracy and safety of a cut. The innovation of fabricating the base assembly and its components out of fiber enriched high-impact nylon substantially reduces the weight of the device and the addition of stabilizer fins and damping strips substantially increases the torsional strength of the rolling plate assembly 100. One example of the fiber enriched plastic is fiber enriched high-impact nylon.

Worm Drive or Left Sided Saw Blade

Figure 14:
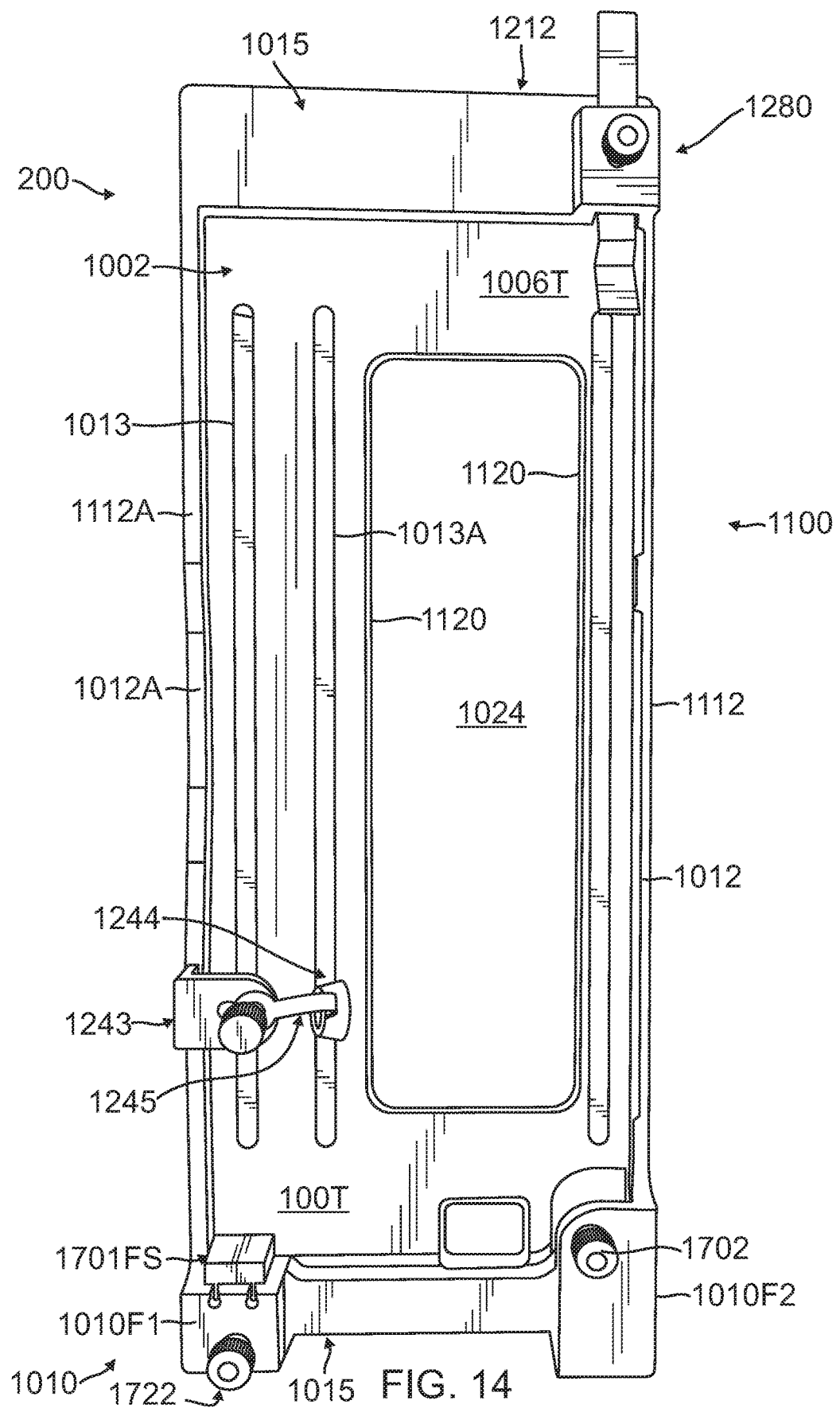
FIG. 14 is a top perspective view of the improved rolling plate assembly for a worm drive or left bladed saw without the cutting guide inserted and without a power saw retained.
Figure 15:
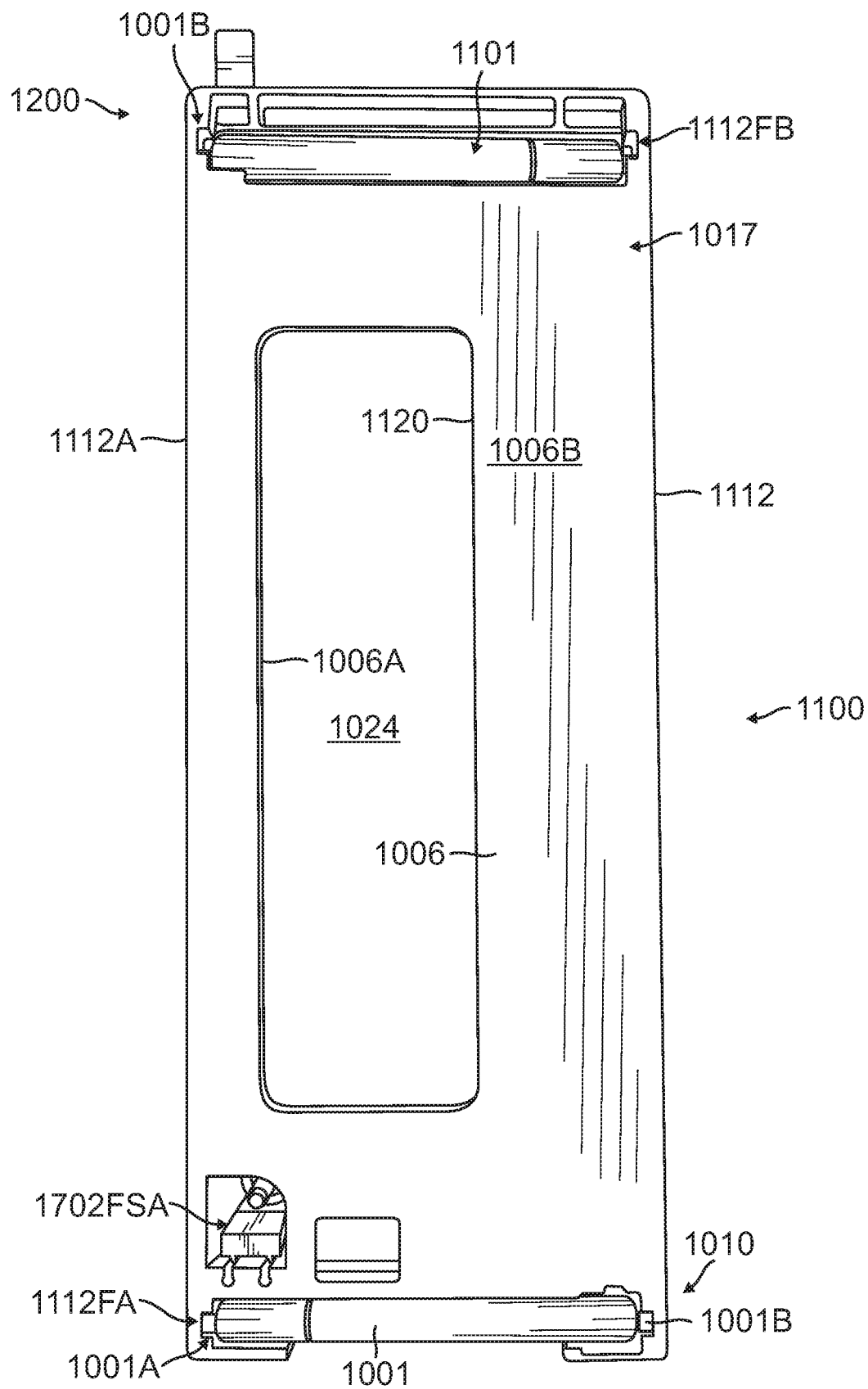
FIG. 15 is a bottom plan view of the improved rolling plate assembly for a worm drive or left bladed saw without the cutting guide inserted and without a power saw retained.

Referring to FIG. 14, there is illustrated a top plan view of the second embodiment for a worm drive or left sided improved rolling plate assembly 1100 without the cutting guide inserted and without a power saw retained. Referring to FIG. 15, there is illustrated a bottom plan view of the second embodiment for a worm drive or left sided improved rolling plate assembly 1100 without the cutting guide inserted and without a power saw retained.

The main difference between the first and second embodiments is the number of contact points used to retain the saw. The first embodiment for the sidewinder used three retaining members at the rear of the rolling plate assembly whereas the second embodiment for the left sided or worm drive only uses one retaining member at the rear of the rolling plate assembly. The second embodiment herein disclosed also contains a side retaining member 1243, Side retaining member 1243 is located at a longitudinal location between front saw retaining member 1010LF1 and rear retaining member 1280 and at a horizontal position on an opposite side of 1280 or on the same side of the roller plate assembly as guide retaining member 1010F1. Side retaining member 1243 for improved rolling plate assembly 1100 has a rubber foot 1244 attached by a tether 1245. Side retaining member 1243 is only on improved rolling plate assembly 1100 for the worm drive or left sided saw, Referring to FIG. 16, there is illustrated a left side elevational plan view of the second embodiment for a worm drive or left sided improved rolling plate assembly 1100 without the cutting guide inserted and without a power saw retained.

Referring to FIG. 14, a significant improvement of the present invention rolling plate assembly 1100 is that the base or skate plate 1002 is formed or molded out of a single piece of fiber reinforced plastic. The base 1002 of the improved rolling plate assembly 1100 assembly has a front side 1015 comprising a front saw retaining member 1010F2 and a front guide retaining member 1010F1.

Referring to FIGS. 14 and 15, the one-piece constructed base 1002 has a front side 1015 and a rear side 1017. Base 1002 further has a rear section 1212 that extends horizontally across base 1002 that contains rear retaining housing member 1280. Rear section 1212 is connected to front saw retaining member 1010F2 on a first side by a first longitudinal sidewall 1112 which has a first raised stabilizer rail 1012. Rear section 1212 is also connected to first housing retaining member 1010F1 by a parallel oppositely disposed second longitudinal sidewall 1112A which has a second raised stabilizer rail 1012A.

Referring to FIGS. 14 through 17, first raised stabilizer rail 1012 on sidewall 1112 has a top surface having a first portion 1012FT1 and a spaced apart second portion 1012FT2 with a reduced wall 1114B in between 1012FT1 and 1012FT2. The reduced portion 1114B has a first arcuate lip 1114B1 to align it with first top portion 1012FT1 and a second arcuate lip 1114B2 to align it with second top portion 1012FT2. The opposite side has a straight stabilizer rail 1114A. A portion of the base 1002 is further comprised of a top horizontal flat plate section 1006T extending between front wheel housing member 1010 and rear wheel housing member 1200. Formed into flat plate section 1006T are a pair of parallel first longitudinal indented marker 1013 and second and second longitudinal indented marker 1013A. Second longitudinal indented marker 1013A is located closer to second longitudinal sidewall 1112A.

The flat plate 1006 extends for the entire interior area bounded by the front wheel housing member 1010, the rear wheel housing member 1200, the first longitudinal sidewall 1112 and the second longitudinal sidewall 1112A. Formed into the flat plate 1006 is a saw blade penetration opening 1024 which is bounded on all interior sides by interior sidewall 1120 which extends perpendicularly downward from the top 1006T of flat plate section 1006 and terminates in the bottom 1006B of the flat plate section 1006. All of these components of the base 1002 including front wheel housing member 1010, rear wheel housing member 1200, the first longitudinal sidewall 1112, first raised stabilizer rail 1012, the second longitudinal sidewall 1112A, second raised stabilizer rail 1012A, top flat plate section 1006T, bottom 1006B, interior circumferential wall 1120, and longitudinal indented markers 1013 and 1013A are all formed of a single piece of material which preferably is injection molded fiber enriched high-impact nylon. This design greatly simplifies the frame assembly as described in the patents identified in the prior art section of this patent application, eliminating many separate component parts and greatly reducing the cost of manufacture and assembly. The injection molded plastic provides much lighter weight and reduced manufacturing costs as compared to a metal base. It is possible to make the base 1002 and all of its components out of metal or any other suitable material such as high-impact nylon. A first damping strip 1013R is glued or otherwise affixed into longitudinal indented marker 1013. A second damping strip 1013AR is glued or otherwise affixed into longitudinal indented marker 1013A. Damping strips 1013R and 1013AR are preferably made of rubber. The longitudinal damping strips provide additional gripping to the saw plate and reduce sliding of the saw plate and kickback of the saw.

Figure 17:
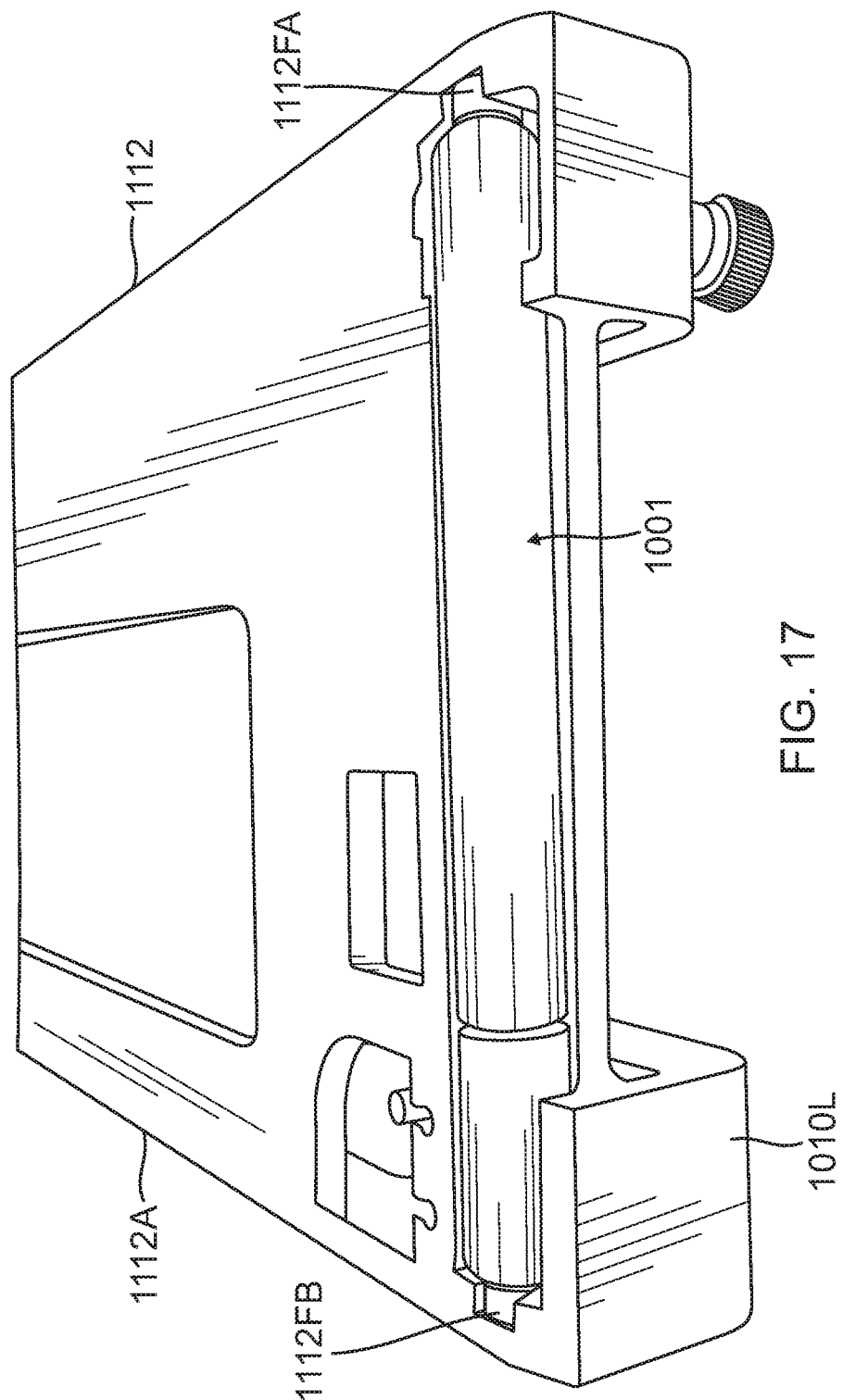
FIG. 17 is a close-up bottom perspective view of the front bottom of the base plate for a worm drive or left bladed saw illustrating the front rolling wheel.
Figure 18:
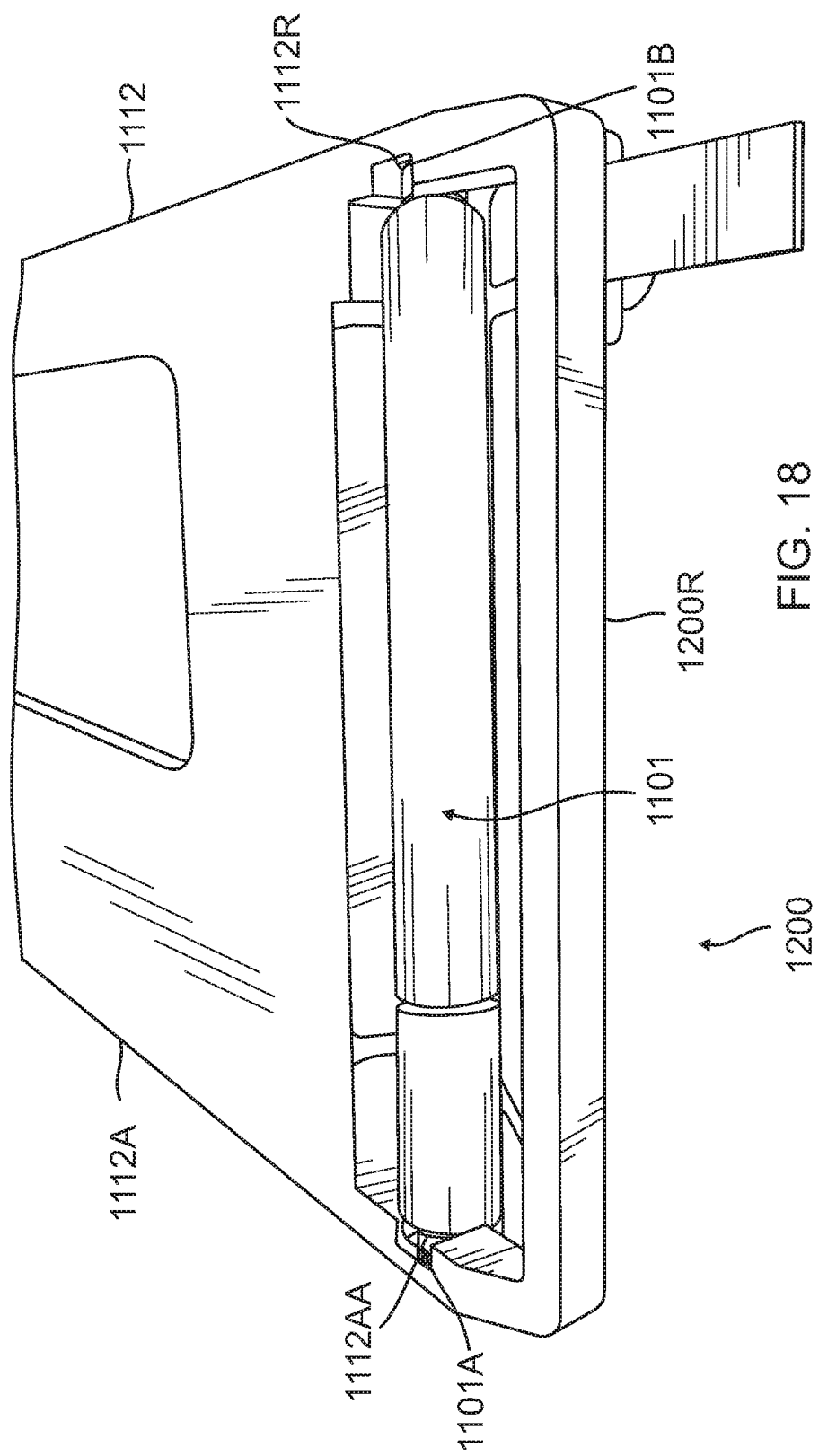
FIG. 18 is a close-up bottom perspective view of the rear bottom of the base plate for a worm drive or left bladed saw illustrating the rear rolling wheel.

An additional significant improvement in the present invention rolling plate assembly 1100 is the redesign of the wheels and how they are retained in the front wheel housing member 1010 and second rear housing member 1200 which will now be described in detail. Referring to FIG. 17, there is illustrated a close-up bottom perspective view of the front bottom of the base illustrating the front wheel assembly. Referring to FIG. 18, there is illustrated a close-up bottom perspective view of the rear bottom of the base 1002 illustrating a rear rolling wheel assembly. Referring to FIGS. 17 and 18, front rolling wheel 1001 is located below and extends behind and below a leading edge 1010L of front wheel housing 1010. Similarly, rear rolling wheel 1101 is located below and extends behind and below the rear edge 1200R of rear wheel housing 1200. By having one long wheel 1001 instead of two shorter aligned wheels in the front and one long wheel 1101 instead of two shorter aligned wheels in the rear, there is more rolling surface for the improved rolling plate assembly 1100. As a result, there is more friction of the wheels 1001 and 1101 against the surface on which it rolls and therefore this increased wheel length and additional frictional surface provides more stability to the improved rolling plate assembly 1100 so that the improved rolling plate assembly 1100 will not veer out of the cutting line as a cut is being made.

Referring to FIGS. 17 and 18, in addition to the improvement in the length of a single wheel 1001 or 1101, the method of attachment and removal of each wheel is also significantly improved. Front rolling wheel 1001 is removably retained in wheel retainer 1112FA by pin 1001A (see FIG. 15) and wheel retainer 1112FB by pin 1001B (see FIG. 15). Referring to FIG. 18, rear rolling wheel 1101 is removably retained in wheel retainer 1112AA by pin 1101A and wheel retainer 1112R by pin 1101B. The flexibility of the fiber reinforced resin of the components of the base 1002 enables the front rolling wheel 1001 and the rear rolling wheel 1101 to be removed.

In the preferred embodiment, the wheels 1001 and 1101 are made of rubber or other material which can achieve a traction and protection on a smooth surface. In one embodiment, each wheel can be approximately one-half (½) inch in diameter and therefore extends by approximately one-eighth (⅛) inch below the lower surface of the housing members 1010 and 1200. The wheel diameters can range between three-eighths (⅜) of an inch to three-quarters (¾) of an inch. The wheels 1001 and 1101 are preferably made of rubber but can also be made of other materials such as polyurethane. The key feature of the wheels 1001 and 1101 is that they must be made of materials which have good lateral traction on a smooth surface such as a piece of plywood or a 2×4. One problem discussed in the prior art is that a smooth plate affixed to the rotary power saw can slip sideways and cause binding of the rotary saw which results in kickback. The traction of the present invention wheels significantly reduces any lateral movement of the rotary power saw as it cuts through a workpiece and thereby significantly reduces the possibility of kickback. In addition, by having the wheels 1001 and 1101 within the housings 1010 and 1200, the strength of the attachment of the wheels is increased since the weight of the saw pushes down on the assembly to help retain the wheels within the assembly as the saw is moved.

Figure 19:
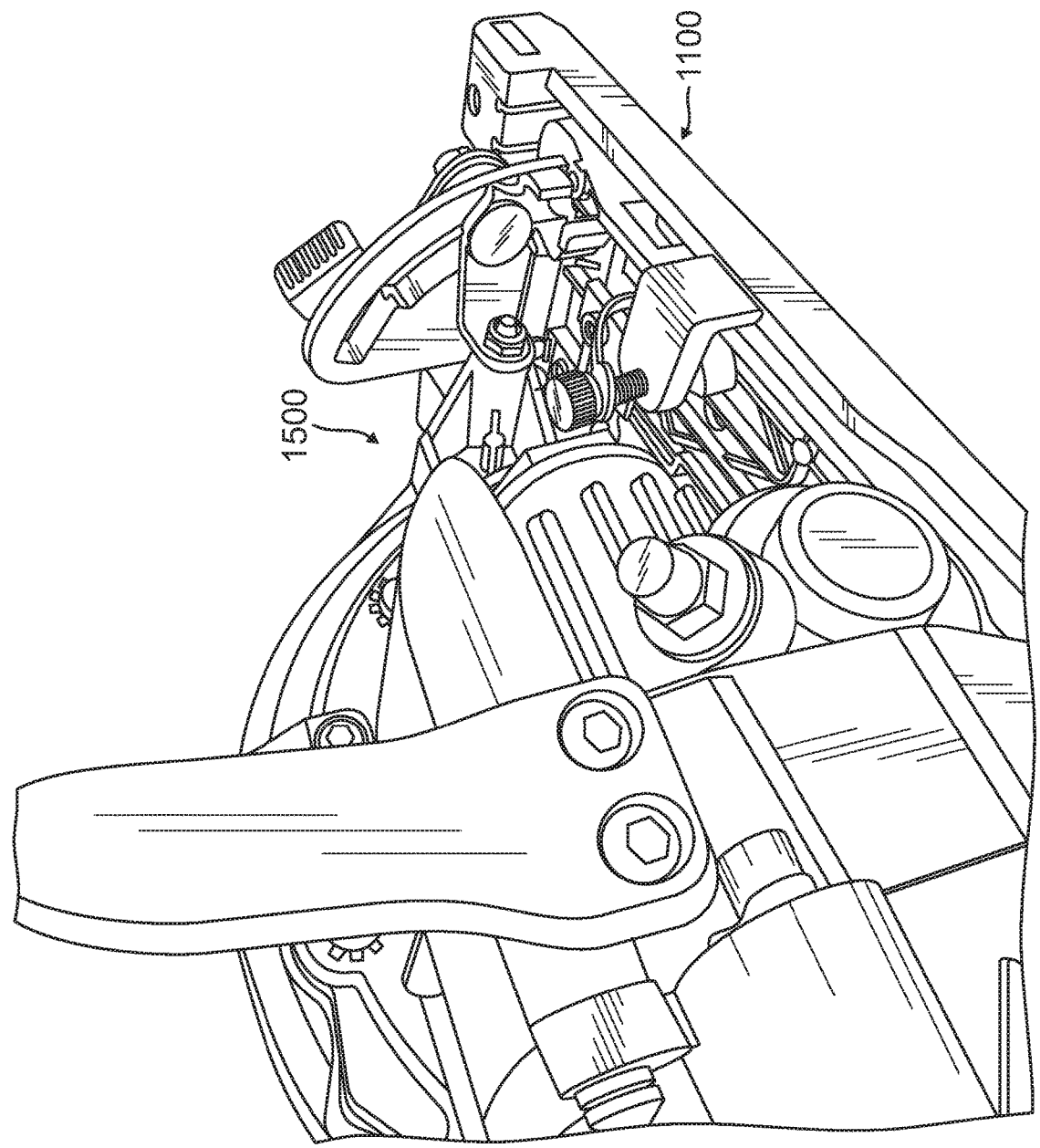
FIG. 19 is a close-up side perspective view of the base plate for a worm drive or left bladed saw illustrating a saw retained by front retaining members of the rolling plate assembly.
Figure 20:
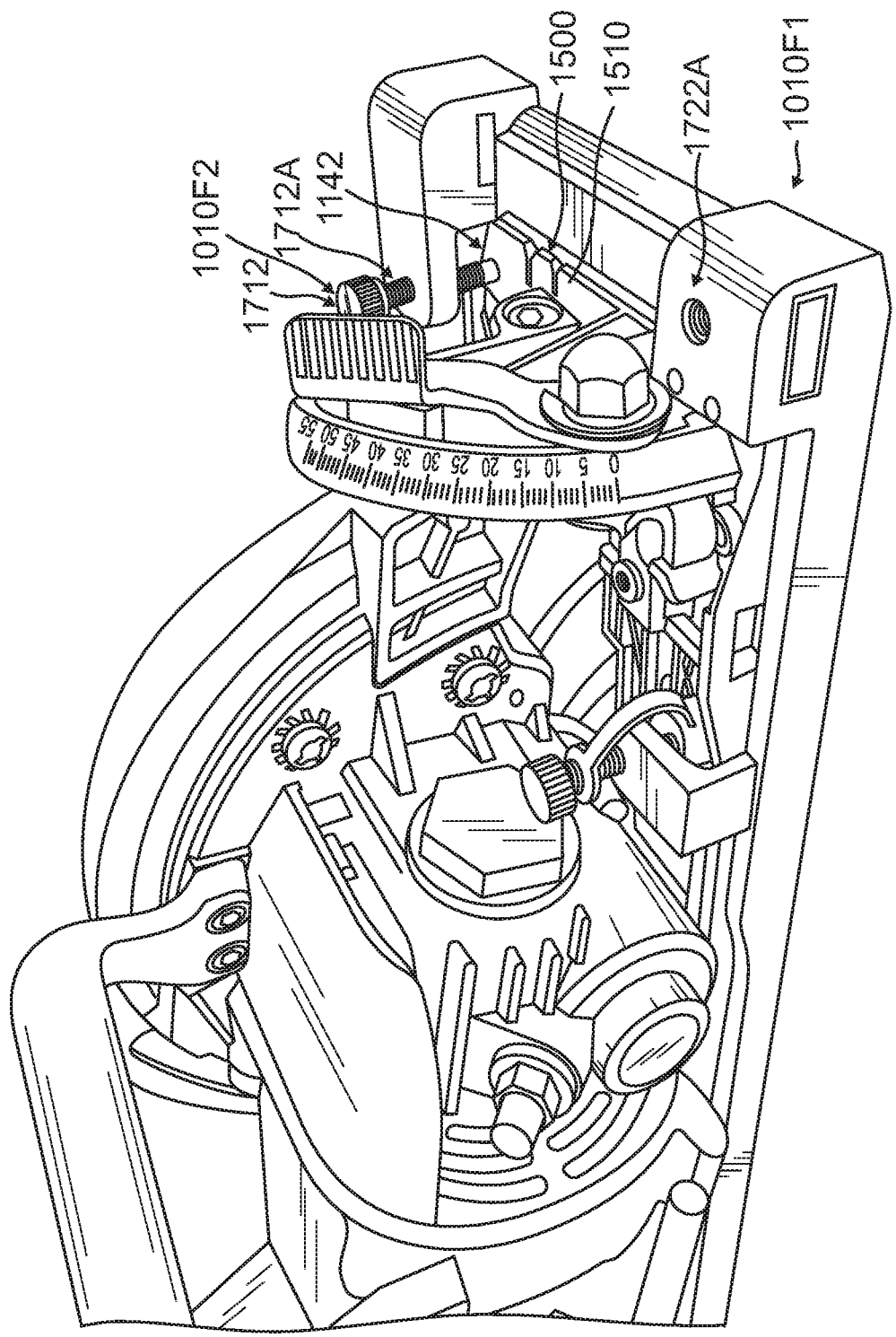
FIG. 20 is a close-up top perspective view of the front of the base plate for a worm drive or left bladed saw retained by rear retaining members of the rolling plate assembly.
Figure 21:
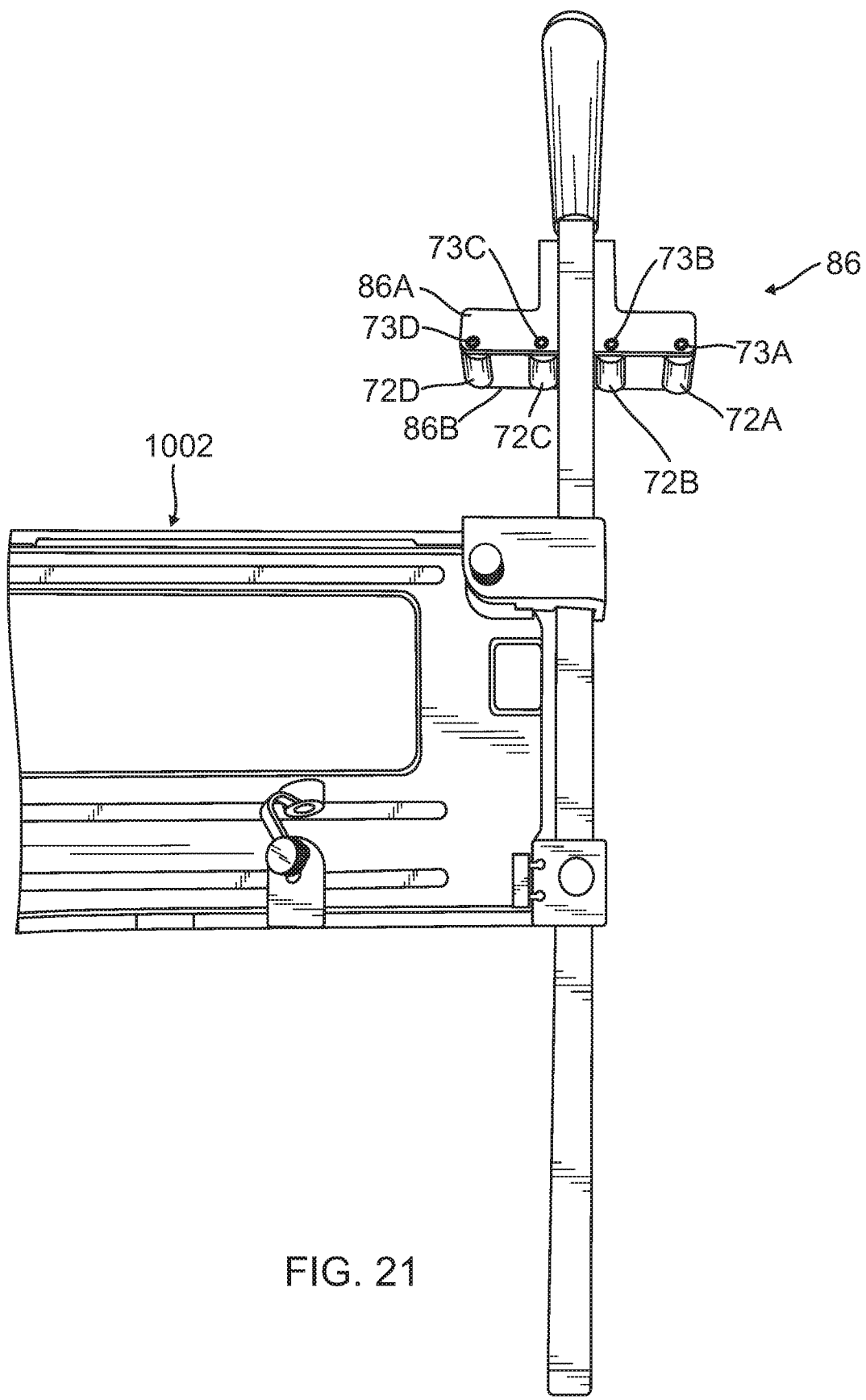
FIG. 21 is a top perspective view of the improved rolling plate assembly for a worm drive or left bladed saw with the cutting guide inserted and without a power saw retained.

The second significant improvement in the present invention rolling plate assembly 1100 is the apparatus by which the cutting tool is retained. First, the means by which the rotary power saw is attached to the front of the rolling plate assembly will be described. Referring to FIG. 19, there is illustrated a close-up top perspective view of the front of a power saw plate retained by front retaining members of the rolling plate assembly 1100. Referring to FIGS. 20 and 21, front saw retaining member 1010F2 retains a front section 1510 of a rotary power saw plate 1500 and the front guide retaining member 1010F1 retains a cutting guide.

Further referring to FIGS. 19 and 20, there is illustrated a close-up top perspective view of the front of a power saw plate 1500 retained by front retaining members of the rolling plate assembly 1100. The power saw plate 1500 has a front end 1510 inserted into a slot 1142 beneath front saw retaining member 1010F2. Front saw retaining member 1010F2 assists in retaining the saw plate 1500. Front guide retaining member 1010F1 retains a cutting guide 71 (illustrated in FIG. 9) in place. Front saw retaining member 1010F2 retains a front end 1510 of power saw plate 1500 by a first front threaded bolt 1712 which extends through a first front threaded opening 1712A in front saw retaining member 1010F2. Front guide retaining member 1010F1 of the rolling plate assembly 1100 has a second front threaded bolt 1722 (see FIG. 14) that extends through a second front threaded opening 1722A (see FIG. 20) of the rolling plate assembly 1100 to retain the cutting guide 71 (illustrated in FIG. 9) in place. The second front thread bolt 1722 extends through the second front threaded opening 1722A to tighten and retain in place cutting guide 71.

Figure 16:
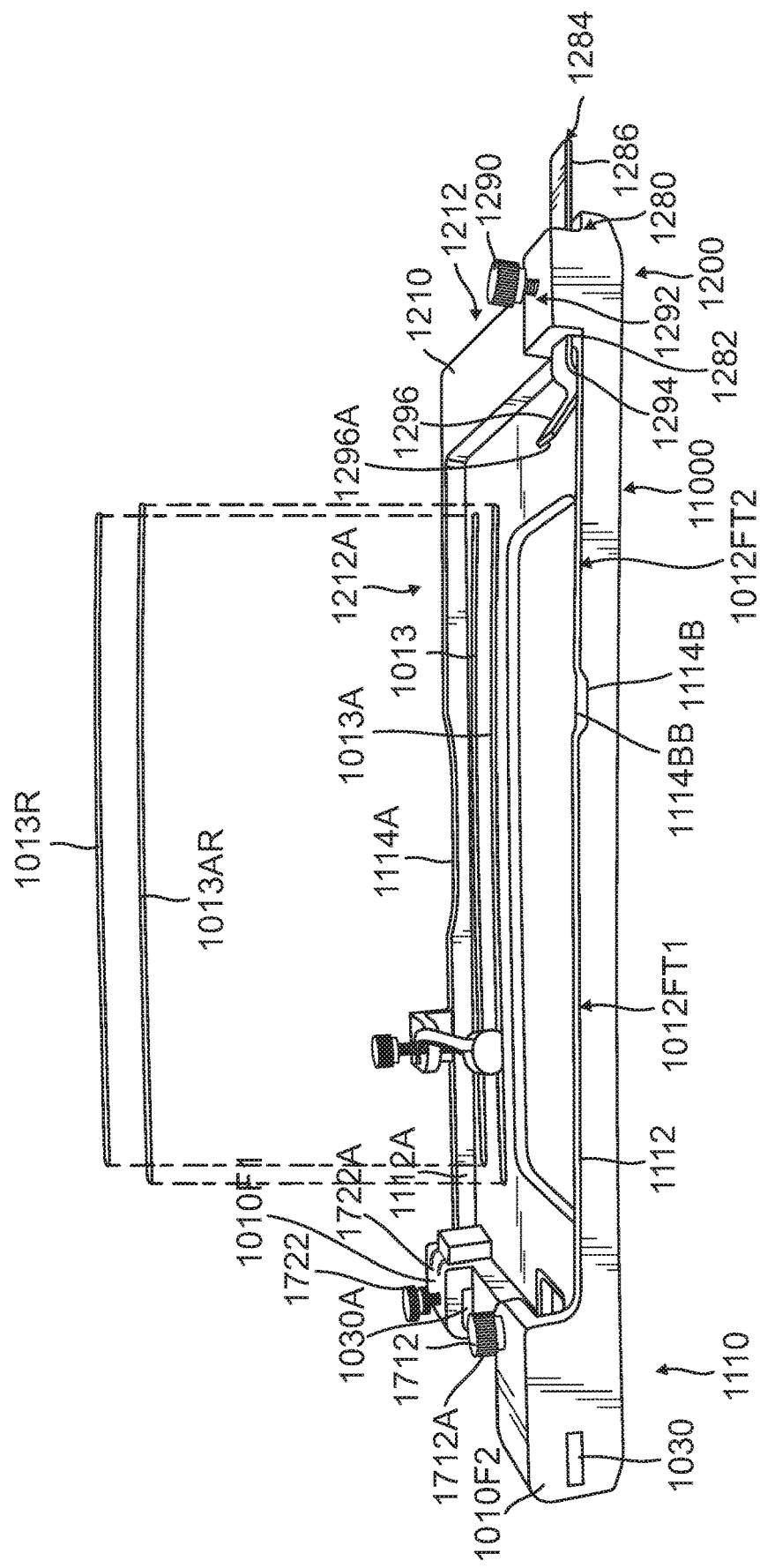
FIG. 16 is a left side elevational view of the improved rolling plate assembly for a worm drive or left bladed saw without the cutting guide inserted and without a power saw retained, with longitudinal indented damping markers illustrated and rubber damping strips shown in an exploded view.
Figure 24:
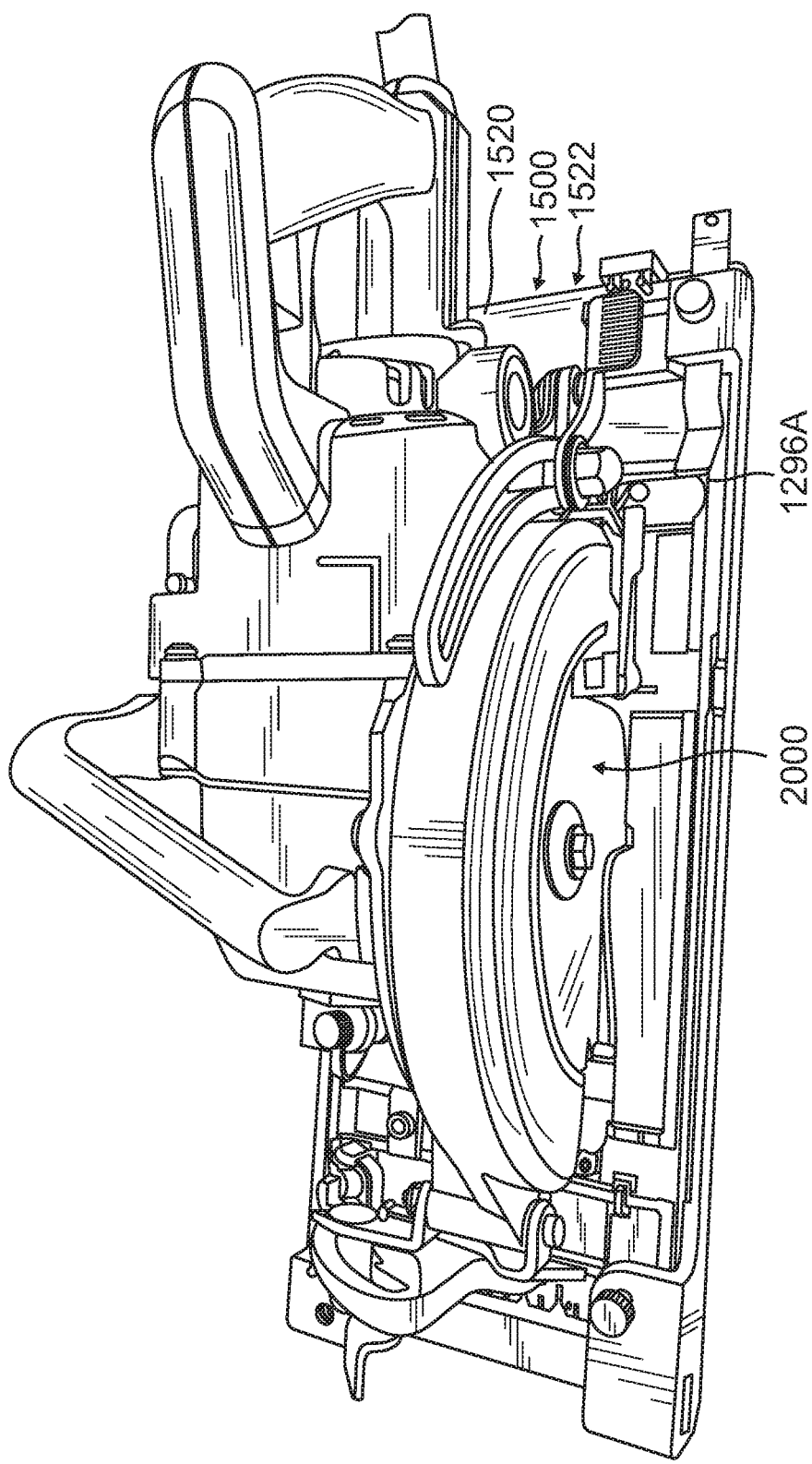
FIG. 24 is a top perspective view of a power saw retained in the base plate of the present invention rolling plate assembly for a worm drive or left bladed saw.

Referring to FIGS. 16 and 20, the rear of a power saw plate is retained by a rear retaining member of the rolling plate assembly. As illustrated in FIG. 16, the power saw plate 1500 is retained at the rear of the roller plate assembly by one spaced apart slidably retained flat rod 1284 having a respective upwardly sloped end to facilitate retention of the rear end 1520 of the power saw flat plate 1500. A rear housing assembly 1200 includes a flat base 1210 supporting a rear retaining housing member 1280. Rear retaining housing member 1280 includes a first longitudinal slot 1282 through which a rear flat retaining rod 1284 having a flat rectangular shaped section 1286 slidably extends through a longitudinal slot 1282. Rear threaded bolt 1290 extends through a threaded opening 1292 in rear retaining housing member 1280 to tighten the location of rear flat retaining rod 1282. The rear flat retaining rod 1282 has a downwardly sloped section 1294 extending to an upwardly sloped section 1296. The rear edge 1522 of the rear section 1520 of the power saw plate 1500 abuts against a lower surface 1296A of upwardly sloped section 1296. This is best illustrated in FIG. 24.

Rear housing retaining members 1280 serves a dual purpose. First, the slotted assembly enables the distance of each flat retaining rod to be moved forward and backward to adjust for different lengths of power saw plates 1500 and in particular, can be adjusted in a forward or rearward direction to accommodate different lengths of the power saw plate 1500. In addition, the upwardly sloped sections 1296 serves to accommodate different thicknesses of power saw plate 1500. The rear end 1520 abuts against the upwardly sloped section 1296. The ability to slide back and forth to adjust the distance of the slope sections accommodates different lengths of power saw plates 1500. Accordingly, when the power saw plate is placed on the present invention, retaining housing assemblies are adjusted to accommodate different lengths of power saw plates and also adjusted to accommodate the different thicknesses of the power saw plates so that the rear 1520 of the power saw plate abuts against the upwardly extending sloped section 1296 so that the rear end 1522 of the power saw plate 1520 is secured abutting against the sloped section. Rear threaded bolt 1290 is then tightened to secure rear flat retaining rod 1284.

In addition, referring to FIGS. 14 and 15, front guide retaining member 1010F1 includes an optional first spacer 1701FS and front saw retaining member 1010F2 includes a second optional spacer 1702FSA to adjust the rolling plate assembly 1100 to allow for shorter front sections of power saw plate 1500. Optional first spacer 1701FS is spaced on top surface 1006 and second optional spacer 1702FSA is inserted from bottom surface 1006A. The widths and lengths of these spacers can vary, but it is within the spirit and scope of this invention for these spacers to be a multitude of sizes and shapes. The widths and lengths of these spacers can vary, but it is within the spirit and scope of this invention for these spacers to be a multitude of sizes and shapes that will fit within the rolling plate assembly and allow for the rolling plate assembly to be used with smaller power saws. Typically, the spacers will have a fixed height and width that correspond to the approximate height and width of the adjacent retaining member. The length measured from the distance between the retaining member and extending longitudinally can vary. Typically, this length has a range from 0.25 inches to 3 inches.

As illustrated in FIG. 9, the third significant improvement in the present invention rolling plate assembly 100 is the addition of a cutting guide 71 which will now be described in detail. Referring to FIG. 9, there is illustrated a top perspective view of the cutting guide 71 having a longitudinal frame 81 having a length 81L1. The cutting guide 71 includes a transverse wheel housing 86 located at a distance 81HD from rear end 81R. The cutting guide has a front end 81F and a rear end 81R. The transverse wheel housing 86 is located between front end 81F and rear end 81R of the longitudinal frame 81. The handle 81H of the longitudinal frame 81 begins at the rear end 81R and extends for the distance 81HD. The cutting guide 71 facilitates a straight and even cut. The cutting guide remains consistent between the first embodiment (sidewinder) and the second embodiment (worm drive).

Referring to FIG. 16, cutting guide slots 1030 and 1030A are respectively formed into front saw retaining member 1010F2 and front guide retaining member 1010F1. Front saw threaded opening 1722A in front saw retaining member 1010F2 is aligned with cutting guide slot 1030. Front guide threaded bolt 1722 is used to affix the cutting guide frame 81 of the cutting guide 71 inserted through aligned slots 1030 and 1030A.

Figure 23:
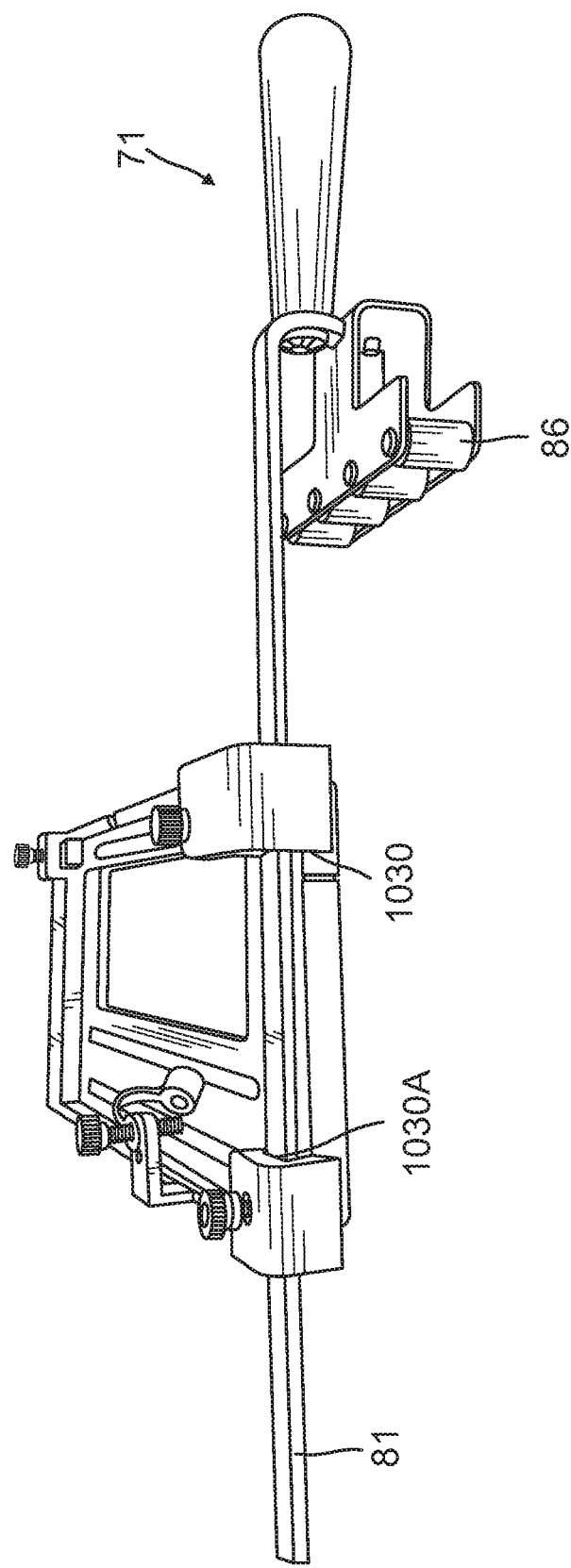
FIG. 23 is a closeup view of the cutting guide installed in the base plate for a worm drive or left bladed saw and extending through aligned slots in the base plate.

Referring to FIGS. 9, 21, and 23, there is illustrated cutting guide 71 installed in the base 1002 and extending through aligned slots 1030 and 1030A. Also illustrated is cutting guide 71 installed in the base 1002 and extending through aligned slots 1030 and 1030A. Referring to FIG. 23, there is illustrated a bottom close-up perspective view of the cutting guide 71 installed in the base 1002 and extending through aligned slots 1030 and 1030A. The cutting guide 71 comprises a guide frame 81 connected to a transverse wheel housing unit 86 which has a top wall 86H and a bottom wall 86B. In addition, the wheel housing unit 86 includes longitudinal gap 88 retaining four (4) spaced apart wheels 72A, 72B, 72C and 72D. Each wheel 72A, 72B, 72C and 72D, has a respective longitudinal opening which rotatably receive a pin 73A, 73B, 73C and 73D. Each pin extends through parallel spaced apart openings in top wall 86A and bottom wall 86B of housing 86.

Figure 22:
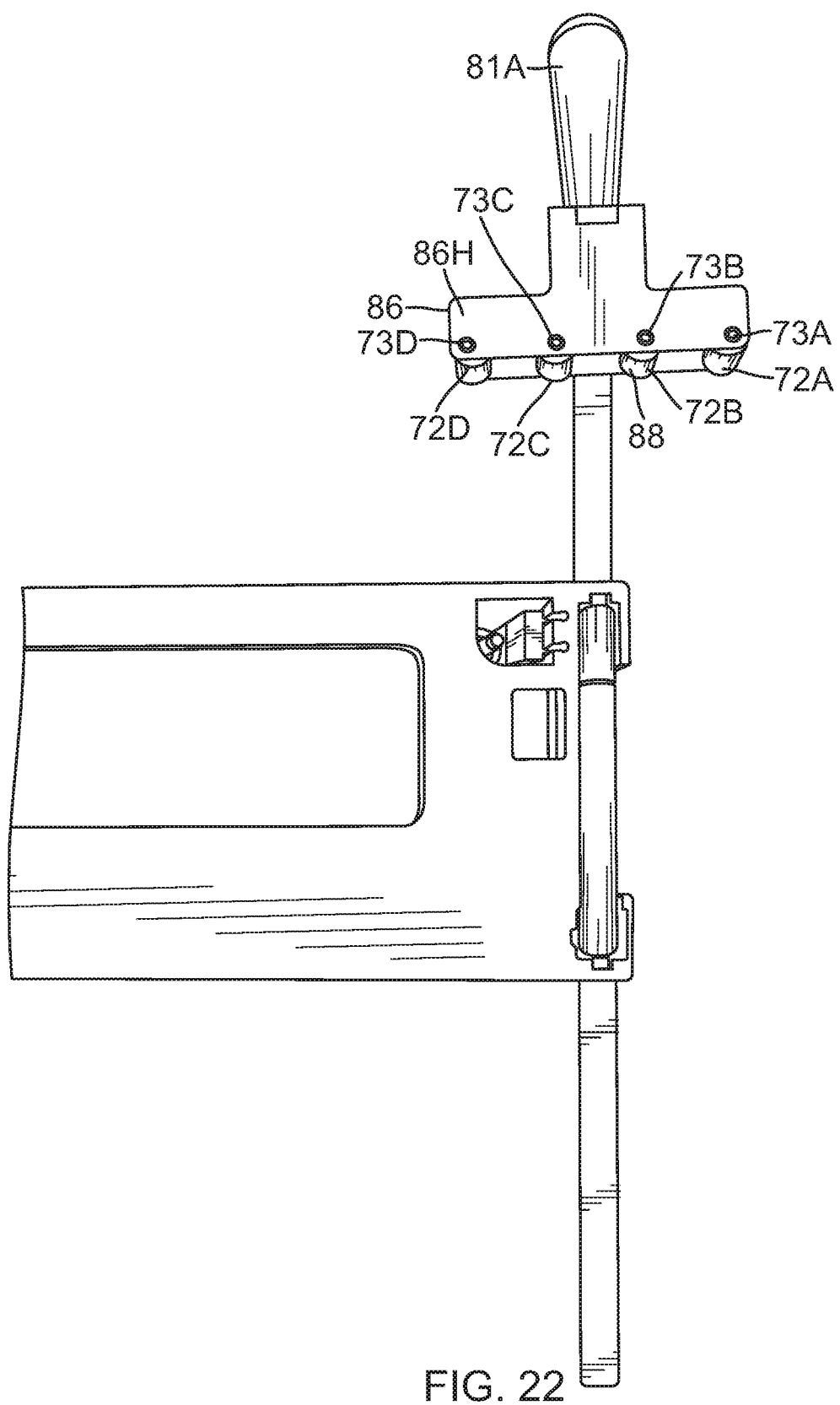
FIG. 22 is a bottom perspective view of the improved rolling plate assembly for a worm drive or left bladed saw with the cutting guide inserted and without a power saw retained.

The cutting guide 71 is illustrated as installed in use in FIGS. 21, 22, and 23. Cutting guide frame 81 is inserted through slots 1030 and 1030A and is tightened by front guide threaded bolt 1722. In operation the location of the cut to be made is determined and the cutting guide frame 81 fixed so that rotating wheels 72A, 72B, 72C, and 72D abut against the vertical side of the piece to be cut so that as the saw blade is moved, it will be forced to move in a straight line provided the vertical surface is straight as the wheels properly align the saw blade 1500 during a cut. The wheel housing is reversible so that the rotating wheels 72A, 72B, 72C and 72D face in the opposite direction toward the rear end of the present invention rolling plate assembly.

Through the present invention, the improved rolling plate assembly 1100 is one complete unit and is easily and quickly attached to the front and back of a rotary power saw. Its rectangular design provides stability to the power saw as it cuts through a workpiece. The improved rolling plate assembly 1100 protects the work surface by elevating the assembly above the work surface by a portion of the diameter of the wheels 1001 and 1101 so that the rotary power saw 2000 can easily roll on the work surface and will not scratch the work surface. This is especially important when the work surface is made of a fine finished surface such as veneer finished woods, marble, granite, etc. In addition to reducing kickback, the strong traction of the wheels helps to absorb the vibration generated by the rotary power saw and enables the user to make easy straight cuts.

The present invention improved rolling plate assembly 1100 is a substantial improvement over the prior design in that it comprises a simple yet efficient frame structure to quickly and removably support a pair of rolling wheels 1001 and 1101. The current power saws come with a mechanisms to quickly adjust the angle of orientation of the saw blade to any desired cut within an arc of 55 degrees. The rolling plate assembly 1100 further comprises a cutting guide to assure that all cuts will be straight. The smooth action of the wheels 1001 and 1101 combined with the steady movement assured by the cutting guide 71 significantly reduces kickback of the saw and substantially increases the speed, accuracy and safety of a cut. The innovation of fabricating the base assembly and its components out of fiber enriched plastic substantially reduces the weight of the device and the addition of stabilizer fins and stabilizer tubes substantially increases the torsional strength of the rolling plate assembly 1100. One example of the fiber enriched plastic is fiber enriched high-impact nylon.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which the invention might be embodied or operated.

What is claimed is:

1. A rolling plate assembly adapted for attachment to a rotary power saw having a rotary power saw flat plate and a rotating saw blade, the rolling plate assembly comprising:
    a. a base formed out of a single piece of fiber reinforced plastic, the base including a top front side having a front saw retaining member and a front guide retaining member and a front bottom side having a front wheel housing member removably retaining a front wheel at a position located below and extending behind a leading edge of the front wheel housing member;
    b. said base also including a rear side with a rear section having a rear wheel housing removably retaining a rear wheel at a position located below and extending behind a rear edge of the rear wheel housing, the rear wheel parallel to the front wheel;
    c. said rear section connected to said front guide retaining member on a first side by a first longitudinal sidewall and said rear section connected to said front saw retaining member on an opposite side by a parallel oppositely disposed second longitudinal sidewall;
    d. said rear section includes a rear retaining housing member with said rear retaining housing member including a longitudinal slot through which a rear flat retaining rod having a flat rectangular shaped section extends and within which the flat rectangular shaped section of the rear flat retaining rod slidably moves in a forward or rearward direction to accommodate different lengths of the power saw, the flat rectangular shaped section extending to a downwardly sloped section and then extending to an upwardly sloped section having a sloped lower surface, a threaded bolt which extends through a first threaded opening in the rear retaining housing member;
    e. said first longitudinal sidewall has a first raised stabilizer rail including a first top surface portion and a spaced apart second top surface portion with a third recessed portion in-between and having an arcuate tip respectively extending from the recessed portion to the first and second top surface portions of the first raised stabilizer rail, and said opposite second longitudinal sidewall has a second raised stabilizer rail having a top surface aligned with the first and second top surface portions of the first stabilizer rail;
    f. said base further comprising a horizontal flat plate section having a top surface and a back surface and extending between said front wheel housing member and said rear wheel housing member with said flat plate section having a saw blade penetration opening which is bounded by an interior sidewall extending from the top surface to the bottom surface;
    g. a first flat damping strip on the top surface and a spaced apart second flat damping strip on the top surface and located between and parallel to said second longitudinal sidewall and said saw blade penetration opening;
    h. said front side having a front slot for receiving a front end of a saw plate, said slot formed beneath the front saw retaining member with a plate threaded bolt to retain a portion of the front end of the saw plate and an offset cutting guide first slot, said front side having a cutting guide second slot with a threaded bolt retaining member, the slots parallel to each other;
    i. a cutting guide having a longitudinal flat frame with a front end and a rear end, a transverse wheel housing located between the front end and rear end of the longitudinal frame, a handle beginning at the rear end and extending to the wheel housing, the longitudinal flat frame of the cutting guide extending through the first slot and the second slot and retained in position by the threaded bolt;
    j. a side retaining member located on the second longitudinal sidewall opposite to the side of the rear retaining member and having a rubber foot attached by a tether; and
    k. the saw flat plate retained at its front end by the plate threaded bolt, the saw plate retained at its rear end by said upwardly sloped rear retaining member.

2. A rolling plate assembly adapted for attachment to a rotary power saw having a rotary power saw flat plate and a rotating saw blade in accordance with claim 1, the wheel housing further comprising: a top wall and a bottom wall, a longitudinal gap retaining four spaced apart wheels, each respective wheel having a respective longitudinal opening which respectively rotatably receive a pin, each respective pin extending through parallel spaced apart openings in the top wall and the bottom wall.

3. A rolling plate assembly adapted for attachment to a rotary power saw having a rotary power saw flat plate and a rotating saw blade in accordance with claim 2, the wheel housing further comprising: the four wheels of the wheel housing face toward the front end of the cutting guide.

4. A rolling plate assembly adapted for attachment to a rotary power saw having a rotary power saw flat plate and a rotating saw blade in accordance with claim 3, the wheel housing further comprising: the four wheels of the wheel housing face toward the rear end of the cutting guide.

5. The rolling assembly adapted for attachment to a rotary power saw having a rotary power saw flat plate and a rotating saw blade in accordance with claim 1, further comprising: the first wheel and the second wheel of the rolling plate assembly are made of polyurethane or rubber.

6. The rolling plate assembly adapted for attachment to a rotary power saw having a rotary power saw flat plate and a rotating saw blade in accordance with claim 1, the cutting guide further comprising at least four wheels within the traverse wheel housing located between the front end and rear end of the longitudinal frame.

7. A rolling plate assembly adapted for attachment to a rotary power saw having a rotary power saw flat plate and a rotating saw blade, the rolling plate assembly comprising:
 a. a base formed out of a single piece of fiber reinforced plastic, the base including a top front side having a front saw retaining member and a front guide retaining member, and a bottom side having a front wheel housing member removably retaining a front wheel at a position located below and extending behind a leading edge of the front wheel housing member;
 b. said base also including a bottom side having a rear section having a rear wheel housing removably retaining a rear wheel at a position located below and extending behind a rear edge of the rear wheel housing, the rear wheel parallel to the front wheel;
 c. said rear section connected to said front guide retaining member on a first side by a first longitudinal sidewall and said rear section connected to said front saw retaining member on an opposite side by a parallel oppositely disposed second longitudinal sidewall;
 d. said rear section includes a rear retaining housing member with said rear retaining housing member including a longitudinal slot through which a rear flat retaining rod having a flat rectangular shaped section extends and within which the flat rectangular shaped section of the rear flat retaining rod slidably moves in a forward or rearward direction to accommodate different lengths of the power saw, the flat rectangular shaped section extending to a downwardly sloped section and then extending to an upwardly sloped section having a sloped lower surface;
 e. a threaded bolt which extends through a threaded bolt opening in said rear retaining housing member;
 f. said first longitudinal sidewall has a first raised stabilizer rail including a first top surface portion and a spaced apart second top surface portion with a third recessed portion in-between and having an arcuate tip respectively extending from the recessed portion to the first and second top surface portions of the first raised stabilizer rail, and said opposite second longitudinal sidewall has a second raised stabilizer rail having a top surface aligned with the first and second top surface portions of the first stabilizer rail;
 g. said base further comprising a horizontal flat plate section extending between said front wheel housing member and said rear wheel housing member with said flat plate section having a saw blade penetration opening which is bounded by an interior sidewall extending from the top surface to the bottom surface;
 h. a first flat damping strip on the top surface and a spaced apart second flat damping strip on the top surface located between and parallel to said first longitudinal sidewall and said saw blade penetration opening;
 i. said front saw retaining member having a first slot for receiving a front end of the saw flat plate, said slot formed beneath the front saw retaining member and an offset gap with a first threaded bolt opening sized to receive a first threaded bolt, said front guide retaining member having a second slot and a second threaded bolt opening sized to receive a second threaded bolt;
 j. a side retaining member located at a position longitudinal location between said front saw retaining member and said rear retaining member and on the same side of the roller plate assembly as said front guide retaining member with said side retaining member having a rubber foot attached by a tether; and
 k. the saw flat plate retained at its front end by the first threaded bolt, the saw flat plate retained at its rear end by said upwardly sloped rear retaining member.

8. The rolling plate assembly adapted for attachment to a rotary power saw having a rotary power saw flat plate and a rotating saw blade in accordance with claim 7 further comprising: located between and parallel to said first longitudinal sidewall and said opening on said flat plate section are a first flat stabilizing rib on the top surface and a spaced apart second stabilizing rib on the top surface.

9. The rolling plate assembly adapted for attachment to a rotary power saw having a rotary power saw flat plate and a rotating saw blade, in accordance with claim 7 further comprising: said base is made from a material selected from the group consisting of injection molded fiber enriched plastic, polyurethane, and metal.

10. The rolling plate assembly adapted for attachment to a rotary power saw having a rotary power saw flat plate and a rotating saw blade in accordance with claim 7 further comprising: said front guide retaining member having a first slot and a first threaded opening receiving a first threaded bolt aligned with the first slot and said front saw retaining member having a first slot and a first threaded opening receiving a first threaded bolt aligned with the first slot of said front saw retaining member.

11. The rolling plate assembly adapted for attachment to a rotary power saw having a rotary power saw flat plate and a rotating saw blade in accordance with claim 7 further comprising: said front guide retaining member having a first slot and a first threaded opening receiving a first threaded bolt aligned with the first slot and said front saw said front guide retaining member having a first slot and a first threaded opening receiving a first threaded bolt aligned with the first slot.

12. The rolling plate assembly adapted for attachment to a rotary power saw having a rotary power saw flat plate and a rotating saw blade in accordance with claim 11 further comprising: a cutting guide having a longitudinal flat frame with a front end and a rear end, a transverse wheel housing located between the front end and rear end of the longitudinal frame, a handle beginning at the rear end and extending to the wheel housing, the longitudinal flat frame of the cutting guide extending through the first slot and the second slot and retained in position by the first threaded bolt.

13. The rolling plate assembly adapted for attachment to a rotary power saw having a rotary power saw flat plate and a rotating saw blade in accordance with claim 12, further comprising: the wheel housing further comprising: at least two wheels facing toward the front end of the cutting guide.

14. The rolling plate assembly adapted for attachment to a rotary power saw having a rotary power saw flat plate and a rotating saw blade in accordance with claim 12, further comprising: the wheel housing further comprising: at least two wheels facing toward the rear end of the cutting guide.

15. The rolling assembly adapted for attachment to a rotary power saw having a rotary power saw plate and a rotating saw blade in accordance with claim 7, further comprising: the front wheel and the rear wheel of the rolling plate assembly are made of polyurethane or rubber.

16. A rolling plate assembly adapted for attachment to a rotary power saw having a rotary power saw flat plate and a rotating saw blade, the rolling plate assembly comprising:
 a. a base formed out of a single piece of fiber reinforced plastic, the base including a top front side having a front saw retaining member and a front guide retaining member and a front bottom side having a front wheel housing member removably retaining a front wheel at a position located below and extending behind a leading edge of the front wheel housing member;

b. said base also including a rear side with a rear section having a rear wheel housing removably retaining a rear wheel at a position located below and extending behind a rear edge of the rear wheel housing, the rear wheel parallel to the front wheel;

c. said rear section connected to said front guide retaining member on a first side by a first longitudinal sidewall and said rear section connected to said front saw retaining member on an opposite side by a parallel oppositely disposed second longitudinal sidewall;

d. said rear section includes a rear retaining housing member with said rear retaining housing member including a longitudinal slot through which a rear flat retaining rod having a flat rectangular shaped section extends and within which the flat rectangular shaped section of the rear flat retaining rod slidably moves in a forward or rearward direction to accommodate different lengths of the power saw, the flat rectangular shaped section extending to a downwardly sloped section and then extending to an upwardly sloped section having a sloped lower surface, a threaded bolt which extends through a first threaded opening in the rear retaining housing member;

e. said first longitudinal sidewall has a first raised stabilizer rail including a first top surface portion and a spaced apart second top surface portion with a third recessed portion in-between and having an arcuate tip respectively extending from the recessed portion to the first and second top surface portions of the first raised stabilizer rail, and said opposite second longitudinal sidewall has a second raised stabilizer rail having a top surface aligned with the first and second top surface portions of the first stabilizer rail;

f. said base further comprising a horizontal flat plate section having a top surface and a back surface and extending between said front wheel housing member and said rear wheel housing member with said flat plate section having a saw blade penetration opening which is bounded by an interior sidewall extending from the top surface to the bottom surface;

g. a first flat damping strip on the top surface and a spaced apart second flat damping strip on the top surface and located between and parallel to said second longitudinal sidewall and said saw blade penetration opening;

h. said front side having a front slot for receiving a front end of a saw plate, said slot formed beneath the front saw retaining member with a plate threaded bolt to retain a portion of the front end of the saw plate and an offset cutting guide first slot, said front side having a cutting guide second slot with a threaded bolt retaining member, the slots parallel to each other;

i. a cutting guide having a longitudinal flat frame with a front end and a rear end, a transverse wheel housing located between the front end and rear end of the longitudinal frame having at least two wheels, a handle beginning at the rear end and extending to the wheel housing, the longitudinal flat frame of the cutting guide extending through the first slot and the second slot and retained in position by the threaded bolt;

j. a side retaining member located on the second longitudinal sidewall opposite to the side of the rear retaining member and having a rubber foot attached by a tether; and k. the saw flat plate retained at its front end by the plate threaded bolt, the saw plate retained at its rear end by said upwardly sloped rear retaining member.

\* \* \* \* \*